United States Patent
Okazaki et al.

(10) Patent No.: US 11,484,840 B2
(45) Date of Patent: Nov. 1, 2022

(54) RAW WATER CHANNEL SPACER AND SPIRAL WOUND MEMBRANE ELEMENT INCLUDING THE SAME

(71) Applicant: NITTO DENKO CORPORATION, Osaka (JP)

(72) Inventors: Yuha Okazaki, Osaka (JP); Yasuhiro Uda, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 16/349,831

(22) PCT Filed: Jun. 21, 2017

(86) PCT No.: PCT/JP2017/022819
§ 371 (c)(1),
(2) Date: May 14, 2019

(87) PCT Pub. No.: WO2018/092343
PCT Pub. Date: May 24, 2018

(65) Prior Publication Data
US 2020/0164315 A1 May 28, 2020

(30) Foreign Application Priority Data
Nov. 18, 2016 (JP) .............................. JP2016-225396
May 22, 2017 (JP) .............................. JP2017-101262

(51) Int. Cl.
*B01D 63/10* (2006.01)
*B01D 65/08* (2006.01)
(Continued)

(52) U.S. Cl.
CPC ............. *B01D 63/10* (2013.01); *B01D 65/08* (2013.01); *B32B 3/28* (2013.01); *B32B 27/12* (2013.01);
(Continued)

(58) Field of Classification Search
CPC .... B01D 63/10; B01D 2313/143; B32B 3/26; B32B 27/12
See application file for complete search history.

(56) References Cited

U.S. PATENT DOCUMENTS 4,186,781 A * 2/1980 Kim ...................... B29C 59/022
139/1 R
4,213,858 A * 7/1980 Boberg .................. B01D 61/28
210/321.74
(Continued)

FOREIGN PATENT DOCUMENTS

CN 104411385 A 3/2015
EP 2864026 A1 4/2015
(Continued)

OTHER PUBLICATIONS

Written Opinion of the International Searching Authority issued in International Bureau of WIPO Patent Application No. PCT/JP2017/022819, dated Sep. 5, 2017, along with an English translation thereof.
(Continued)

*Primary Examiner* — Krishnan S Menon
(74) *Attorney, Agent, or Firm* — Greenblum & Bernstein, P.L.C.

(57) ABSTRACT

A raw water channel spacer capable of suppressing formation of a concentration polarization layer in a region in the vicinity of a separation membrane in a raw water channel, and a spiral wound membrane element including the same are provided. A raw water channel spacer is formed by superposing a first yarn row and a second yarn row, and includes alternately a first mesh structure having a configuration in which first rectangular meshes formed of the yarn rows are continuous in an extending direction of the second yarn row, and a second mesh structure having a configuration in which meshes are continuous in the extending
(Continued)

direction of the second yarn row such that an interval in the second yarn row is smaller than an interval of the second yarn row forming the first mesh structure.

13 Claims, 16 Drawing Sheets

(51) Int. Cl.
*D04H 3/02* (2006.01)
*D04H 3/04* (2012.01)
*B32B 27/12* (2006.01)
*B32B 3/28* (2006.01)
*B01D 65/02* (2006.01)

(52) U.S. Cl.
CPC ............... *D04H 3/02* (2013.01); *D04H 3/04* (2013.01); *B01D 65/02* (2013.01); *B01D 2313/04* (2013.01); *B01D 2313/143* (2013.01); *B01D 2313/146* (2013.01)

(56) References Cited

U.S. PATENT DOCUMENTS

| 4,680,215 | A | * | 7/1987 | Mercer | B32B 3/26 |
| | | | | | 428/107 |
| 5,137,600 | A | * | 8/1992 | Barnes | D21H 25/005 |
| | | | | | 162/115 |
| 9,452,383 | B2 | * | 9/2016 | Bowen | B01D 53/22 |
| 10,035,106 | B2 | * | 7/2018 | Kidwell | B01D 63/103 |
| 10,166,513 | B2 | * | 1/2019 | Li | B01D 63/081 |
| 2004/0182774 | A1 | | 9/2004 | Hirokawa et al. | |
| 2007/0175812 | A1 | | 8/2007 | Chikura et al. | |
| 2018/0169589 | A1 | * | 6/2018 | MacFarlane | B01D 63/08 |

FOREIGN PATENT DOCUMENTS

| JP | H5-168869 A | 7/1993 |
| JP | 2000-153270 A | 6/2000 |
| JP | 2000-237554 A | 9/2000 |
| JP | 2002-09535 A | 4/2002 |
| JP | 2004-89763 A | 3/2004 |
| JP | 2005-305422 A | 11/2005 |
| JP | 2009-195870 A | 9/2009 |
| JP | 2015-66488 A | 4/2015 |
| JP | 2015-205269 A | 11/2015 |
| WO | 2014/004142 | 1/2014 |
| WO | 2015/153116 A1 | 10/2015 |

OTHER PUBLICATIONS

Office Action issued in Chinese family member Patent Appl. No. 201780007655.3, dated Jan. 15, 2019, along with an English translation thereof.

International Search Report issued in International Bureau of WIPO Patent Application No. PCT/JP2017/022819, dated Sep. 5, 2017, along with an English translation thereof.

Indian Office Action for Indian Patent Application No. 201947019671, dated Apr. 3, 2020.

European Search Report for European Application No. EP17871925.8, dated Sep. 30, 2019.

Shakaib et al., "CFD modeling for flow and mass transfer in spacer-obstructed membrane feed channels;" Journal of Membrane Science; vol. 326, No. 2, pp. 270-284; Jan. 20, 2009.

* cited by examiner

FIG. 7

Table 1 A proportion of an area of easy-polarization region to surface of separation membranes

| | Embodiment | Modification 1 | Modification 2 | Modification 3 | Modification 4 | Comparative example |
|---|---|---|---|---|---|---|
| Inclination angle α1 | 90° | 50° | 85° | 95° | 120° | — |
| The proportion of the area of $\tau \leq 0.75$ PPa (%) | 16 | 19 | 17 | 15 | 10 | 20 |

Table 2 A proportion of an area of easy-polarization region to surface of separation membranes

| | Modification 5 | Modification 6 | Modification 7 | Modification 8 | Modification 9 |
|---|---|---|---|---|---|
| The proportion of the area of $r \leq 0.75$ Pa (%) | 18 | 19 | 16 | 15 | 14 |

FIG. 16 (b) Table 3 Measurement values of concentration ratio Cr and pure water volume flux Jw

| Pure water volume flux Jw [$m^3/(m^2s)$] | Embodiment A | Embodiment B | Modification 10 | Comparative example |
|---|---|---|---|---|
| $0.85 \times 10^{-5}$ | — | — | — | 2.6 |
| $0.89 \times 10^{-5}$ | — | — | — | 2.7 |
| $0.91 \times 10^{-5}$ | 2.1 | — | — | 2.8 |
| $1.00 \times 10^{-5}$ | — | — | — | 3.0 |
| $1.03 \times 10^{-5}$ | — | — | 1.6 | — |
| $1.13 \times 10^{-5}$ | — | 3.1 | — | — |
| $1.43 \times 10^{-5}$ | — | — | — | 3.3 |
| $1.51 \times 10^{-5}$ | — | — | 2.4 | — | ns
RAW WATER CHANNEL SPACER AND SPIRAL WOUND MEMBRANE ELEMENT INCLUDING THE SAME

TECHNICAL FIELD

The present invention relates to a spiral wound membrane element for separating components dissolved in a liquid, and more particularly to a raw water channel spacer for the spiral wound membrane element.

BACKGROUND ART

In recent years, attempts have been made to filter ions, salts and the like contained in tap water or the like using a separation membrane such as a spiral wound membrane element to produce water more suitable for beverages.

The spiral wound membrane element includes a water collecting pipe and a plurality of separation membranes wound around the water collecting pipe. Each of the separation membranes is formed in a bag shape by superimposing separation membranes on both surfaces of a sheet-like permeate spacer, sealing three sides by means of adhesion or the like in this state, and making the other side to be an open end. The spiral wound membrane element is configured such that the open end is connected to the water collecting pipe so that permeate flowing along the permeate spacer flows into the water collecting pipe.

A mesh-like raw water channel spacer forming a channel of raw water such as tap water is sandwiched between the separation membranes formed in a bag shape. The raw water supplied to the spiral wound membrane element flows along the raw water channel spacer while part of the raw water permeates through the separation membrane to be permeate and is sent out to the outside through the water collecting pipe.

Japanese Unexamined Patent Application Publication No. 2005-305422 discloses a spiral wound membrane element including a raw water channel spacer in which warp yarns are arranged along a flow direction of raw water, weft yarns are arranged in a direction crossing with respect to the flow direction of the raw water, and the weft yarns are formed thinner than the warp yarns, so that pressure loss in a raw water channel can be reduced.

PRIOR ART DOCUMENT

Patent Document

Patent Document 1: Japanese Unexamined Patent Application

DISCLOSURE OF THE INVENTION

Problems to be Solved by the Invention

Meanwhile, as the raw water permeates through the separation membrane, ions and salts which cannot permeate through the separation membrane remain in a region in the vicinity of the separation membrane on a raw water channel side. The remaining ions and salts are accumulated in the vicinity of the separation membrane, so that a layer having a higher concentration of ions and salts than other regions of the raw water channel (hereinafter, appropriately expressed as a concentration polarization layer) is formed. As a result, osmotic pressure in the vicinity of a membrane surface of the separation membrane increases, so that the amount of permeate that permeates through the separation membrane decreases, resulting in a problem that permeate cannot be efficiently obtained from the raw water.

Therefore, an object of the present invention is to provide a raw water channel spacer capable of suppressing the formation of a concentration polarization layer in a region in the vicinity of a separation membrane, and a spiral wound membrane element including the same.

Means for Solving the Problems

According to a first preferred aspect of the present invention, a raw water channel spacer is a raw water channel spacer having a two-layer structure that is sandwiched between a first separation membrane and a second separation membrane wound around a water collecting pipe of a spiral wound membrane element, and is formed of a first yarn row and a second yarn row inclined in opposite directions from each other with respect to a direction parallel to the water collecting pipe, the raw water channel spacer including alternately: a first mesh structure configured to be continuous in an extending direction of the second yarn row by the first yarn row and the second yarn row; and a second mesh structure configured to be continuous in the extending direction of the second yarn row by the first yarn row and the second yarn row, in which an interval of the second yarn row is smaller than an interval of the second yarn row forming the first mesh structure.

According to a second preferred aspect, of the present invention, in the raw water channel spacer, inclination with respect to the direction parallel to the water collecting pipe of the first yarn row forming the second mesh structure may be configured to be larger than inclination with respect to the direction parallel to the water collecting pipe of the first yarn row forming the first mesh structure.

According to a third preferred aspect of the present invention, in the raw water channel spacer, the first mesh structure may be configured by alternately arranging a first mesh and an intermediate mesh having a finer mesh than the first mesh, and the second mesh structure may be configured by alternately arranging the intermediate mesh and a second mesh having a finer mesh than the intermediate mesh.

According to a fourth preferred aspect of the present invention, a spiral wound membrane element includes: a water collecting pipe through which permeate flows; a sheet-like permeate spacer; a first separation membrane and a second separation membrane that are each formed in a bag shape in which three sides are sealed in a state where the separation membranes are superimposed on both surfaces of the permeate spacer, and the other side is made to be an open end, the separation membranes wound around the water collecting pipe in a state where the open end is connected to the water collecting pipe; and the raw water channel spacer according to any of the aspects described above.

Effects of the Invention

According to the raw water channel spacer of the present invention, the first mesh structure and the second mesh structure are alternately arranged and extend in directions inclined with respect to the direction parallel to the water collecting pipe. Here, the second mesh structure is formed so that the interval of the second yarn row is smaller than that of the first mesh structure. Therefore, when the raw water flows along the direction parallel to the water collecting pipe, a flow rate of the raw water flowing from the second mesh structure into the first mesh structure adjacent thereto in a downstream side is larger than a flow rate of the raw water flowing from the first mesh structure into the second mesh structure adjacent thereto in a downstream side. As a result, the flow rate of the raw water flowing through the first mesh structure increases, and force of the raw water flow flowing to the downstream side while meandering toward the first separation membrane or the second separation membrane in the periphery of the mesh structure can be increased. On the other hand, since the second mesh structure has a smaller interval of the second yarn row than the first mesh structure, even if the flow rate of the raw water is small, the same level of water force as that of the first mesh structure can be maintained. As a result, it is possible to suppress the formation of the concentration polarization layer by sweeping away ions and salts remaining in the vicinity of both the separation membranes around the first mesh structure and the second mesh structure to the downstream side.

According to the spiral wound membrane element of the present invention, in the raw water channel spacer, the second mesh structure is formed so that the interval of the second yarn row is smaller than that of the first mesh structure. The first mesh structure and the second mesh structure are alternately arranged and extend in directions inclined with respect to the direction parallel to the water collecting pipe. Therefore, when the raw water flows along the direction parallel to the water collecting pipe, a flow rate of the raw water flowing from the second mesh structure into the first mesh structure adjacent thereto in a downstream side is larger than a flow rate of the raw water flowing from the first mesh structure into the second mesh structure adjacent thereto in a downstream side. As a result, the flow rate of the raw water flowing through the first mesh structure increases, and the flow speed of the raw water flow flowing to the downstream side while meandering toward the first separation membrane or the second separation membrane in the periphery of the mesh structure can be made faster. On the other hand, since the second mesh structure has a small interval of the second yarn row, even if the flow rate of the raw water is small, the same level of water force as that of the first mesh structure can be maintained. As a result, it is possible to suppress the formation of the concentration polarization layer by sweeping away ions and salts remaining in the vicinity of both the separation membranes around the first mesh structure and the second mesh structure to the downstream side.

BRIEF DESCRIPTION OF THE DRAWINGS

FIG. 7 is a diagram showing results of fluid analysis simulation of a proportion of an area of an easy-polarization region to both the separation membranes, in raw water channel spacers of Modifications 1 to 4.

FIG. 9 is a diagram showing results of fluid analysis simulation of a proportion of an area of an easy-polarization region to both the separation membranes, in raw water channel spacers of Modifications 5 to 9.

BEST MODE FOR CARRYING OUT THE INVENTION

A filtration device including a spiral wound membrane element according to an embodiment of the present invention will be described below with reference to the drawings. In the following description, an "X" direction indicates a direction parallel to an axial direction of a water collecting pipe, and a "Y" direction and a "Z" direction indicate radial directions of the water collecting pipe orthogonal to each other.

Figure 1:
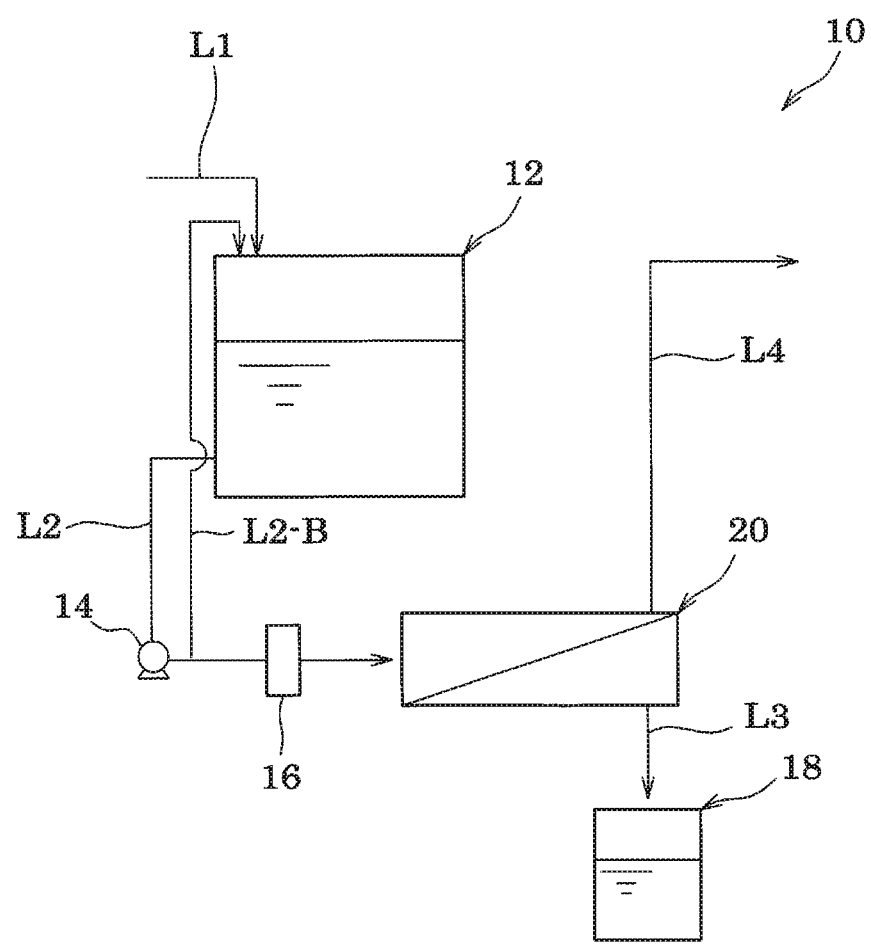
FIG. 1 is a schematic configuration diagram of a filtration device to which a spiral wound membrane element according to an embodiment of the present invention is applied.

As shown in FIG. 1, a filtration device 10 includes a raw water tank 12 for storing raw water such as tap water and a spiral wound membrane element 20 for filtering the raw water. The raw water is supplied to the raw water tank 12, for example, via a supply pipe L1. A water feed pipe 12 for feeding out the raw water to the spiral wound membrane element 20 is connected to the raw water tank 12. A pump 14 for pumping the raw water from the raw water tank 12 and a pretreatment unit 16 for removing turbid components contained in the raw water are installed in the water feed pipe L2. The raw water treated by the pretreatment unit 16 is fed out to the spiral wound membrane element 20 via the water feed pipe L2. A bypass pipe L2-B is connected to a downstream side of the pump 14 in the water feed pipe 12. The bypass pipe L2-B serves to adjust a flow rate of the raw water fed out to the pretreatment unit 16 by returning part of the raw water flowing through the water feed pipe 12 to the raw water tank 12.

The spiral wound membrane element 20 has a function of producing permeate obtained by removing ions and salts from the raw water, and concentrate containing the removed ions and salts. The permeate produced by the spiral wound membrane element 20 is stored in a permeate tank 18 via a permeate pipe L3, and the concentrate is discharged to the outside via a concentrate pipe 14.

Figure 2:
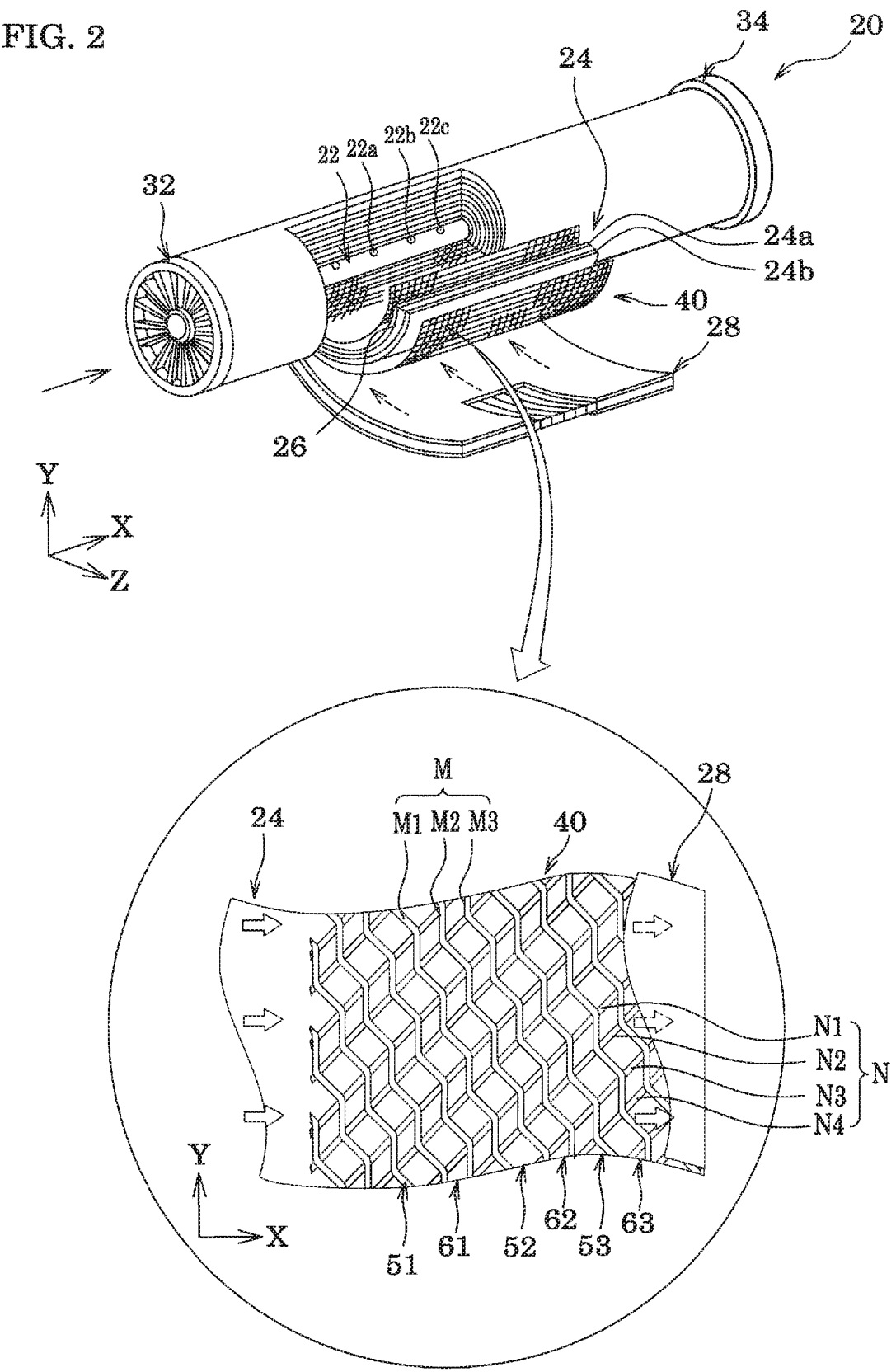
FIG. 2 a perspective view showing a part of the spiral wound membrane element shown in FIG. 1 in a deployed state and including a partially enlarged view showing a configuration of a raw water channel spacer included in the part.

FIG. 2 illustrates a perspective view showing a part of the spiral wound membrane element 20 in a deployed state and a diagram showing a configuration of a raw water channel spacer sandwiched between a first separation membrane and a second separation membrane included in the element.

As shown in FIG. 2, the spiral wound membrane element 20 includes: a water collecting pipe 22 through which the permeate flows; and a first separation membrane 24 and a second separation membrane 28 wound around the water collecting pipe 22, in a state of being superimposed with each other. The spiral wound membrane element 20 is sandwiched between both the separation membranes 24, 28 and includes a raw water channel spacer 40 that forms a raw water channel between both the separation membranes 24, 28. Since the first separation membrane 24 and the second separation membrane 28 have the same configuration, only the configuration of the first separation membrane 24 will be described below.

In the first separation membrane 24, separation membranes 24a, 24b formed of, for example, a reverse osmosis membrane, an ultrafiltration membrane, or a microfiltration membrane, are superimposed with each other on both sides with a permeate spacer 26 interposed therebetween to form a bag shape, and the opening end is connected to the water collecting pipe 22. The permeate spacer 26 forms a channel communicating with the water collecting pipe 22, and the permeate that has permeated through the separation membranes 24a, 24b along this channel flows into the water collecting pipe 22.

A plurality of communicating holes 22a, 22b, 22c are provided in the water collecting pipe 22 at a predetermined pitch along an axial direction, and the permeate that has permeated through both the separation membranes 24, 28 flows into the water collecting pipe 22 from the communicating holes 22a through 22c. The other three sides excluding the open end of the first separation membrane 24 are sealed with an adhesive or the like to prevent, mixing of the permeate and the concentrate.

As shown in FIG. 2, part of the raw water flowing through the raw water channel permeates through either of the separation membranes 24, 28 to be permeate in which muddy components such as ions and salts are removed, and is led to the water collecting pipe 22 along the permeate spacer 26. As flowing along the raw water channel, the residual raw water becomes concentrate containing a large amount of turbid components removed from the permeate, and is discharged to a concentrate pipe L4 (see FIG. 1) on a downstream side.

An upstream cap member 32 and a downstream cap member 34 may be attached to both axial end surfaces of the spiral wound membrane element 20. The upstream cap member 32 is provided with a gap through which the raw water flows into the spiral wound membrane element 20. The downstream cap member 34 is provided with two channels so that the permeate flowing through the water collecting pipe 22 and the concentrate discharged from the raw water channel are not mixed with each other.

Figure 3:
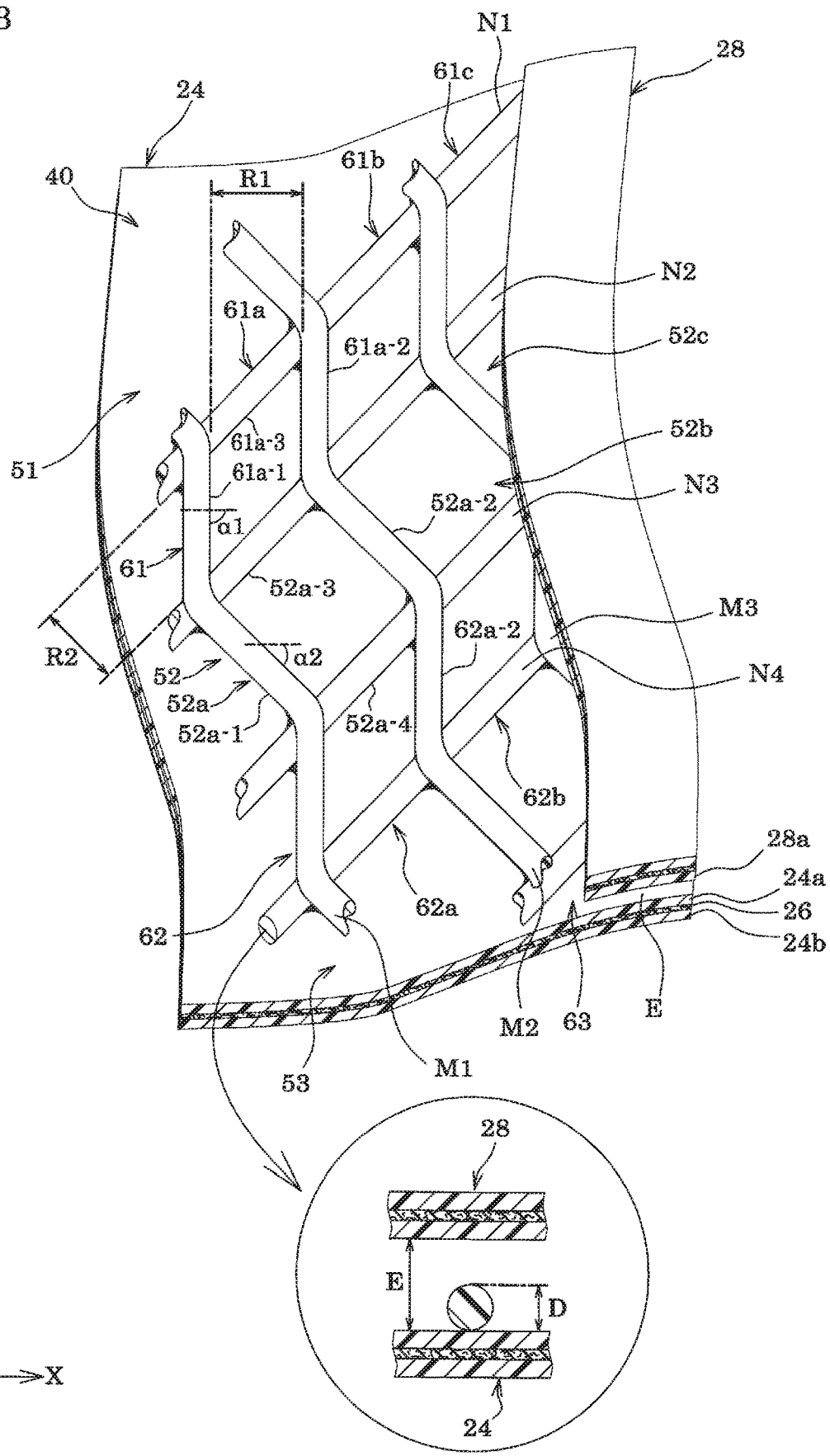
FIG. 3 is a perspective view showing the configuration of a raw water channel spacer sandwiched between first and second separation membranes shown in FIG. 2 and including a cross sectional view thereof in a part.

Next, a configuration of the raw water channel spacer 40 will be described with reference to FIGS. 2 and 3. FIG. 3 is a perspective view showing the configuration of the raw water channel spacer 40 sandwiched between the first separation membrane 24 and the second separation membrane 28.

As shown in FIG. 2 and FIG. 3, the raw water channel spacer 40 is a raw water channel spacer having a two-layer structure in which a first yarn row M and a second yarn row N are superimposed with each other, and is formed by fixing each of yarn rows M, N in a laminated state. The raw water channel spacer may be in a state in which the yarn rows M, N are knitted with each other. The raw water channel spacer 40 alternately includes first mesh structures 51, 52, 53 and second mesh structures 61, 62, 63. Since the first mesh structures 51 to 53 have the same structure, only the first mesh structure 52 will be described in the following description.

As shown in FIG. 3, the first mesh structure 52 is formed such that first rectangular meshes 52a, 52b, 52c are continuous in an extending direction of second yarns N2, N3. Since the configurations of the first rectangular meshes 52a to 52c are the same, only the first rectangular mesh 52a will be described below.

A first side portion. 52a-1 and a second side portion 52a-2 of the first rectangular mesh 52a are formed by first yarns M1, M2, respectively, and a third side portion 52a-3 and a fourth side portion 52a-4 are formed by the second yarns N2, N3. As an example, the first rectangular mesh 52a has an appearance of a square shape configured such that the dimension of each of the side portions 52a-1 to 52a-4 is 3 mm. The yarn rows M, N are arranged so as to incline in opposite directions, for example, by 45° with respect to the X direction. Each of the yarn rows M, N is formed of a resin material such as polyester, polyethylene, or polypropylene, for example, in a cylindrical shape having a diameter D of 0.4 mm. A width F of the raw water channel formed by the raw water channel spacer 40 is 0.8 mm, as an example. The shape of each of the yarn rows M, N is not limited to a columnar shape, and may be formed in a flat plate shape or the like, for example.

Since the second mesh structures 61 to 63 have the same configuration, only the second mesh structure 61 will be described, and the second mesh structures 62, 63 will not be described as appropriate. In the second mesh structure 61, the second rectangular meshes 61a, 61b, 61c having the same configuration are formed to be continuous in an extending direction of second yarns N1, N2.

The first side portion 61a-1 and the second side portion 61a-2 of the second rectangular mesh 61a are formed by the first yarns M1, M2, respectively, and the third side portion 61a-3 of the second rectangular mesh 61a is formed by the second yarn N1. The fourth side portion of the second rectangular mesh 61a is formed of the third side portion 52a-3 in the above-described first rectangular mesh 52a. For example, the second rectangular mesh 61a may be formed in a parallelogram shape with the dimension of each of the side portions 61a-1, 61a-2, 61a-3 being 3 mm.

Here, the second rectangular mesh 61a is configured such that an inclination angle α1 of the first side portion 61a-1 and the second side portion 61a-2 with respect to the X direction is larger than an inclination angle α2 of the first side portion 52a-1 and the second side portion 52a-2 of the first rectangular mesh 52a with respect to the X direction, by bending the first yarns M1, M2. As an example, the inclination angle α1 may be 90° and the inclination angle α2 may be 45°. An interval R1 between both the side portions 61a-1, 61a-2 in the second rectangular mesh 61a is formed to be smaller than an interval between both the side portions 52a-1, 52a-2 in the first rectangular mesh 52a (that is, a length of the third side portion 52a-3).

Similarly, an interval R2 between both the side portions 52a-3, 61a-3 in the second rectangular mesh 61a is formed to be smaller than an interval between both the side portions 52a-3, 52a-4 in the first rectangular mesh 52a (that is, a length of the first side portion 52a-1).

As a result, the second rectangular mesh 61a is configured to have a finer mesh (that is, a smaller surrounding area) than the first rectangular mesh 52a, and is provided such that a resistance (hereinafter referred to as "channel resistance") that the raw water flowing an the X direction receives from the channel is large. Accordingly, a channel resistance of the second mesh structure 61 configured by the meshes having the same configuration as the second rectangular mesh 61a being continuous is larger than a channel resistance of the first mesh structure 52 configured by the meshes of the same configuration as the first rectangular mesh 52a being continuous.

Figure 4:
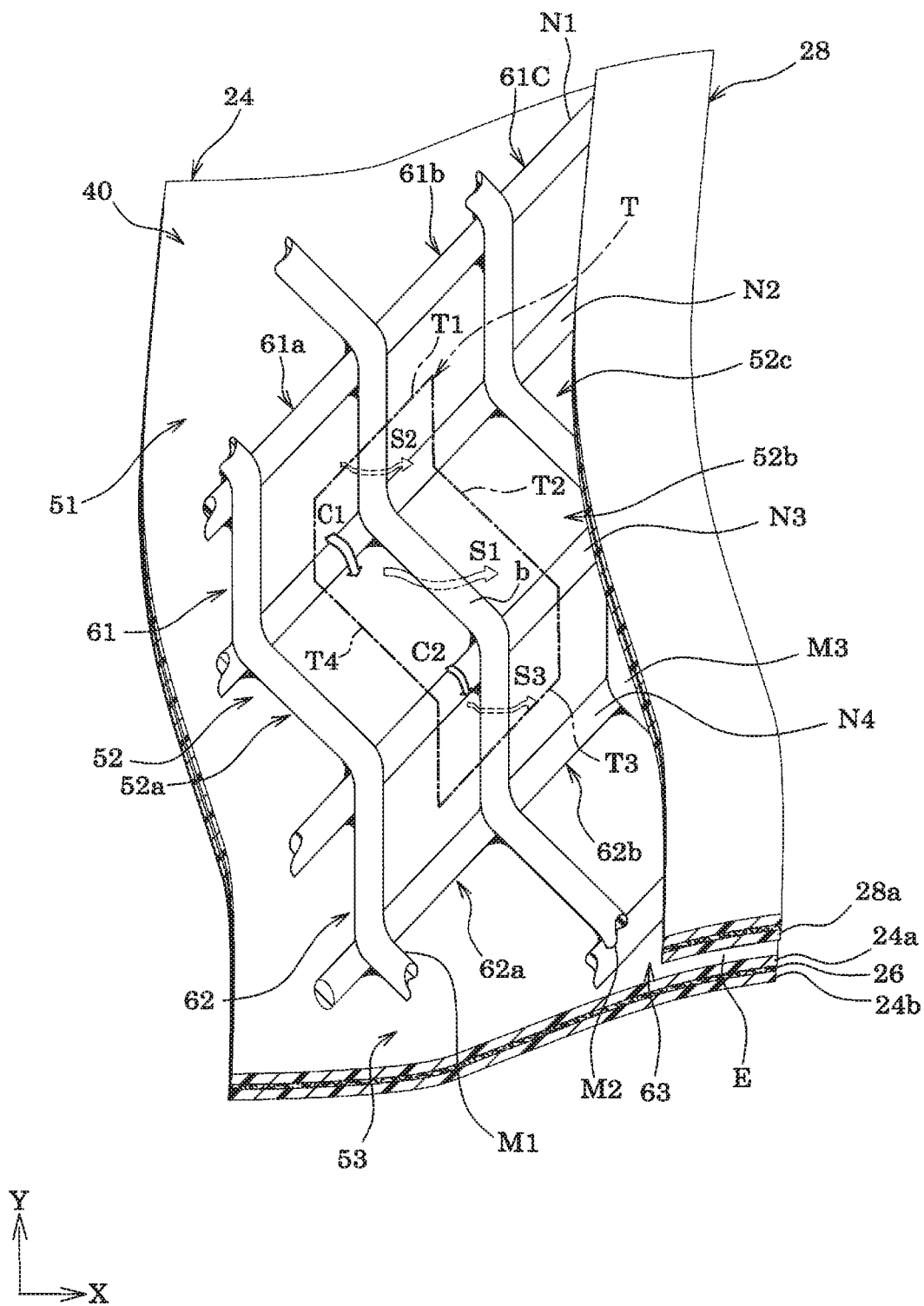
FIG. 4 a perspective view showing a raw water flow formed by the raw water channel spacer sandwiched between the first and second separation membranes shown in FIG. 2 and a target region of fluid analysis simulation.

Here, the raw water flow in each of the mesh structures 52, 61, 62 will be described with reference to FIG. 4. FIG. 4 is a diagram showing the raw water flow formed by the raw water channel spacer 40 and a simulation region 1 in the manner similar to that of FIG. 3. This simulation region T is a region surrounded by imaginary lines T1 to T4 and the imaginary line T1 is an intermediate line between the second yarn N1 and the second yarn N2 connecting a center point of the second rectangular mesh 61a, and a center point of the second rectangular mesh 61b. The imaginary line T3 is an intermediate line between the second yarn N3 and the second yarn N4 connecting a center point of the second rectangular mesh 62a and a center point of the second rectangular mesh 62b. The imaginary line T2 is an intermediate line between the first yarn M2 and the first yarn M3 connecting the center point of the second rectangular mesh 61b and the center point of the second rectangular mesh 62b. The imaginary line 14 is an intermediate line between the first yarn M1 and the first yarn M2 connecting the center point of the second rectangular mesh 61a and the center point of the second rectangular mesh 62a.

An extending direction of each of the mesh structures 52, 61, 62 inclines with respect to the X direction as shown in FIG. 4. Therefore, while passing through the second mesh structure 61, the first mesh structure 52, and the second mesh structure 62 in this order, the raw water flows to the downstream side. In this regard, description will be given by taking the raw water flow in the rectangular meshes 52a, 61a, 62a forming a part of the mesh structures 52, 61, 62, respectively, as an example.

The rectangular meshes 52a, 61a, 62a are arranged adjacently in an order of the second rectangular mesh 61a, the first rectangular mesh 52a, and the second rectangular mesh 62a from the upstream side in the X direction. In the second rectangular mesh 61a, part of the raw water flows into the first rectangular mesh 52a while meandering toward the second separation membrane 28 along a flow C1. This makes it possible to increase the flow speed of the raw water in the region close to the second separation membrane 28 and to sweep away remaining ions and salts retained in the region close to the second separation membrane 28 to the downstream side.

Similarly, in the first rectangular mesh 52a, a part of the raw water flows into the second rectangular mesh 62a while meandering toward the second separation membrane 28 along a flow C2. As a result, residual ions and salts retained in the region close to the second separation membrane 28 can be swept away to the downstream side.

As described above, the channel resistance of the second rectangular meshes 61a, 62a forming a part of the second mesh structures 61, 62 is larger than the channel resistance of the first rectangular mesh 52a forming a part of the first mesh structure 52. Therefore, as shown in FIG. 4, a flow rate Q1 flowing from the second rectangular mesh 61a along the flow C1 into the first rectangular mesh 52a is larger than a flow rate Q2 flowing from the first rectangular mesh 52a along the flow C2 out to the second rectangular mesh 62a. The flow rate of the raw water flowing from the first rectangular mesh 52a to the first rectangular mesh 52b on the downstream side increases by a flow rate Q3 that is the difference between the flow rate Q1 and the flow rate Q2. In this way, the raw water flow rate in the first mesh structure 52 increases and the raw water flow rate in the second mesh structures 61, 62 decreases.

Therefore, among the raw water flows flowing while meandering along flows S1, S2, S3 around the side portions 52a-2, 61a-2, 62a-2 (see FIG. 3) of the rectangular meshes 52a, 61a, 62a toward the first separation membrane 24, the water force of the flow S1 of the raw water in the first mesh structure 52 can be increased. This makes it possible to increase the flow speed of the raw water in a region close to the first separation membrane 24 surrounded by the first mesh structure 52 and to sweep away residual ions and salts retained in the same region to the downstream side.

On the other hand, the flow rates of the flows S2, S3 of the raw water in the second rectangular meshes 61a, 62a are smaller than the flow rate of the flow S1. However, the interval R1 (see FIG. 3) between the first yarns M1, M2 in the second rectangular meshes 61a, 62a is configured to be smaller than the interval between the first yarns M1, M2 in the first rectangular mesh 52a, that is, the length of the third side portion 52a-3 (see FIG. 3). Therefore, even if each of the raw water flow rates in the flows S2, S3 of the raw water is smaller than that of the flow S1 of the raw water as described above, the flows S2, S3 are maintained in a high flow speed state and are maintained to have the water force of the same level as the first rectangular mesh 52a. This makes it possible to increase the flow speed of the raw water in a region close to the first separation membrane 24 surrounded by the second mesh structures 61, 62 and to sweep away residual ions and salts retained in the same region to the downstream side.

Figure 5:
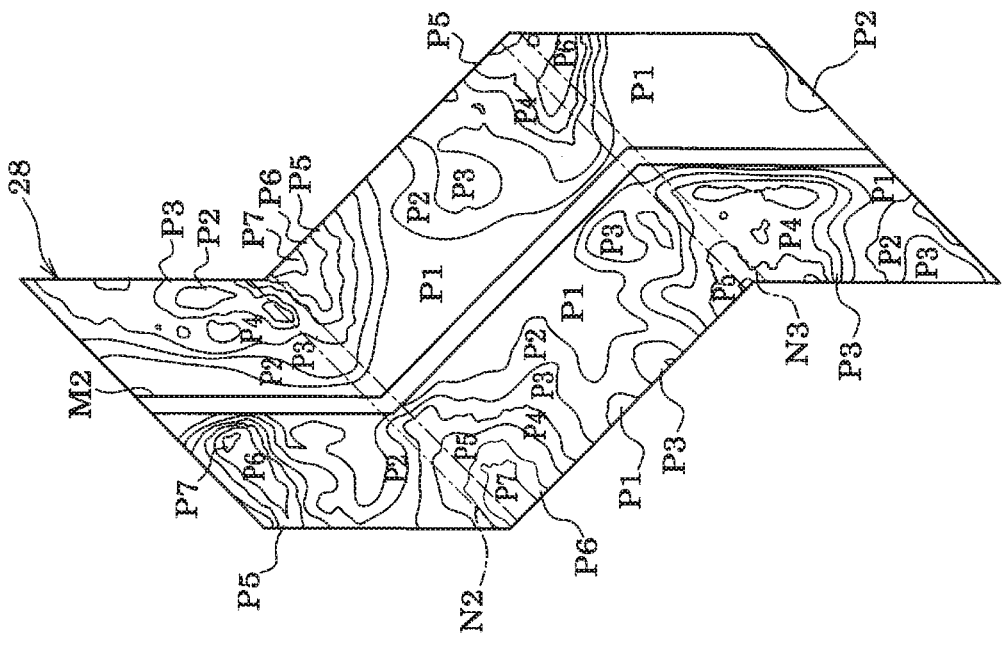
FIG. 5(a) is an isometric line diagram showing a distribution state of a shear stress acting on the first separation membrane shown in FIG. 3.
FIG. 5(b) is an isometric line diagram showing a distribution state of a shear stress acting on the second separation membrane shown in FIG. 3.
Figure 5:
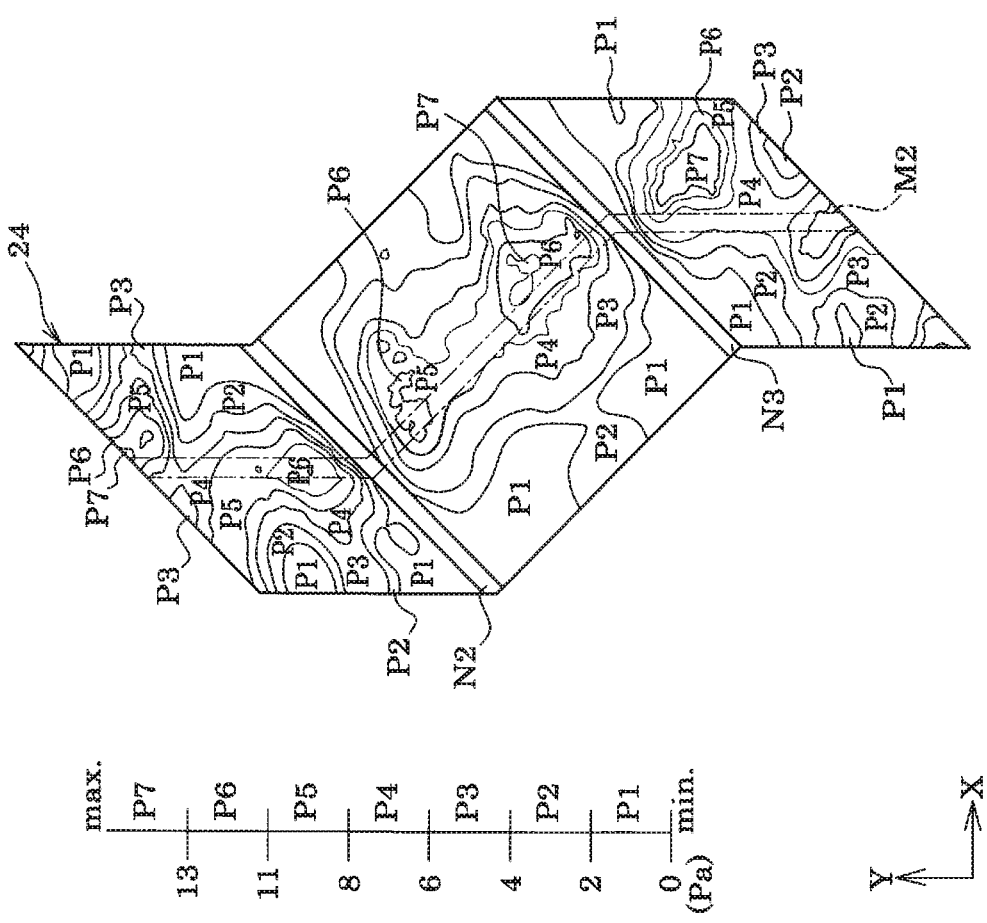

FIG. 5(a) is an isometric line diagram showing a result obtained by determining a magnitude of a shear stress acting on the first separation membrane 24 by the raw water in the region T shown in FIG. 3, by fluid analysis simulation. FIG. 5(b) is an isometric line diagram showing a result obtained by determining a magnitude of a shear stress acting on the second separation membrane 28 in the region T, as similar to FIG. 5(a), by fluid analysis simulation. Here, it means that the larger the magnitude of the shear stress acting on each of the separation membranes 24, 28 is, the greater the effect of the raw water to sweep away the residual ions and salts out, of the region close to each of the separation membranes 24, 28 is. In contrast, it means that the smaller the shear stress acting on each of the separation membranes 24, 28 is, the smaller the effect of the raw water to sweep away the residual ions and salts out of the region close to each of the separation membranes 24, 28 is. In the fluid analysis simulation described above, the flow speed of the raw water flowing into the region T along the X direction is set to 0.162 m/s.

As shown in FIG. 5(a), it can be seen that in the region of the first separation membrane 24 surrounded by the first rectangular meshes 52a, 52b, a large shear stress of same level as that of the region of the first separation membrane 24 surrounded by the second rectangular meshes 61a, 61b, 62a, 62b acts over a wide range, by the raw water meandering around the second side portion 52a-2 (see FIG. 3).

A proportion of an area of the region where the magnitude of the shear stress acting on each of the separation membranes 24, 28 is 0.75 Pa or less, that is, the region where the flow of the raw water in the region close to each of the separation membranes 24, 28 is gentle and the effect of the raw water to sweep away the residual ions and salts is small to the surfaces of both the separation membranes 24, 28 was 16%. In the following description, the above-mentioned region where the magnitude of the shear stress is 0.75 Pa or less is referred to as an easy-polarization region. The average value of the shear stress acting on both the separation membranes 24, 28 shown in FIG. 5(a) and FIG. 5(b) is 3.3 Pa.

Figure 6:
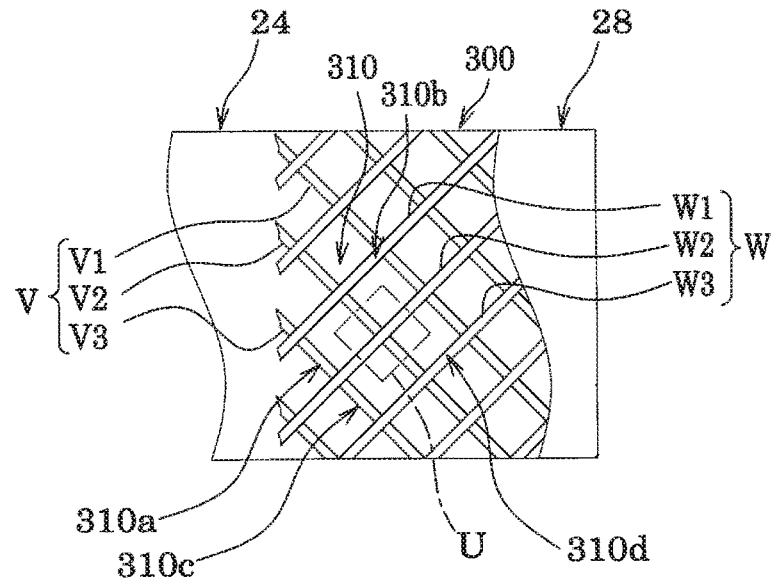
FIG. 6(a) is a diagram showing a configuration of a raw water channel spacer according to a comparative example.
FIG. 6(b) is an isometric line diagram showing a result of calculation of the shear stress acting on the first separation membrane by the raw water flowing in an X direction shown in FIG. 6(a) by fluid analysis simulation.
FIG. 6(c) is an isometric line diagram showing a result of calculation of the shear stress acting on the second separation membrane shown in FIG. 6(a) by fluid analysis simulation, as similar to FIG. 6(b).
Figure 6:
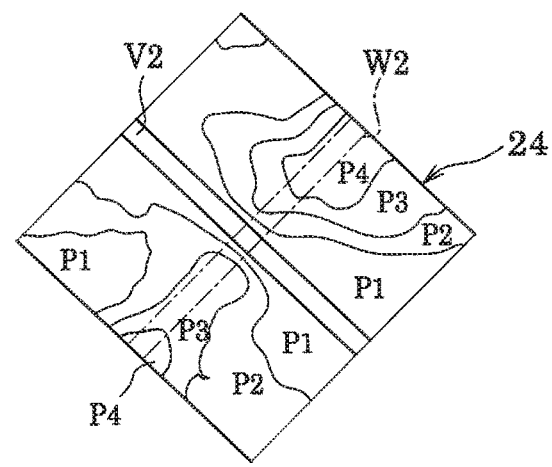
Figure 6:
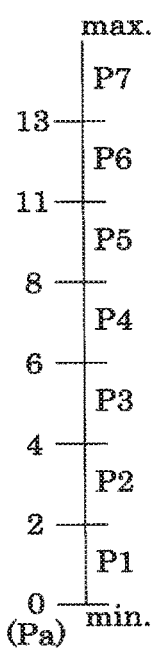
Figure 6:
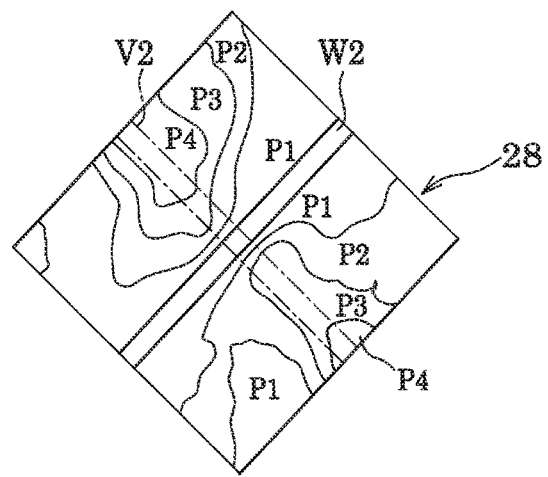

FIG. 6(a) is a diagram showing a configuration of a raw water channel spacer 300 according to a comparative example. FIG. 6(b) is an isometric line diagram showing a result obtained by determining a magnitude of a shear stress acting on the first separation membrane 24 in a region U shown in FIG. 6(a), by fluid analysis simulation. FIG. 6(c) is an isometric line diagram showing a distribution state of the shear stress acting on the second separation membrane 28 in the region U shown in FIG. 6(a). In FIG. 6(b) and FIG. 6(c), the flow speed of the raw water flowing into the region U along the X direction is set to 0.162 m/s.

As shown in FIG. 6(a), the raw water channel spacer 300 has a mesh structure 310 formed by laminating a yarn row V including yarns V1, V2, V3 and a yarn row N including yarns W1, W2, W3 such that the yarn rows V, N are orthogonal to each other. The mesh structure 310 includes rectangular meshes 310a, 310b, 310c, 310d having the same configuration as that of the first rectangular mesh 52a. Note that the region U is a region surrounded by an imaginary line connecting the center points of the rectangular meshes 310a to 310d.

As shown in FIG. 6(b) and FIG. 6(c), the shear stress acting on the region surrounded by the region U of both the separation membranes 21, 28 is about 8 Pa at maximum. A proportion of an area of the easy-polarization region formed in both the separation membranes 24, 28 to the surfaces of both the separation membranes 24, 28 is 20%.

As described above, in the raw water channel spacer 300 of the comparative example, as in the raw water channel spacer 40 of the present embodiment, no large shear stress acts on both the separation membranes 24, 28, and the proportion of the area of the easy-polarization region formed in both the separation membranes 24, 28 is 20% which is relatively high. Thus, the residual ions and salts in the region close to both the separation membranes 24, 28 cannot be swept away thoroughly.

It is conceivable that a raw water channel spacer formed only of the second mesh structures 61, 62, 63 is used, but in this case, the pressure loss caused by the raw water channel spacer is excessive. Thus, there is also a problem that the raw water channel spacer is swept away to the downstream side and a telescope phenomenon occurs.

In contrast, in the raw water channel spacer 40 of the present embodiment, the first mesh structures 51, 52, 53 and the second mesh structures 61, 62, 63 are arranged alternately, and the raw water flowing in the X direction is harder to pass through the second mesh structures 61, 62, 63 than through the first mesh structures 51 to 53. Thus, for example, it is possible to increase the flow rate of the raw water flowing from the second rectangular mesh 61a in the second mesh structure 61 to the first rectangular mesh 52a in the first mesh structure 52. As a result, the same level of the shear stress as that acting on both the separation membranes 24, 28 in the region surrounded by the second rectangular mesh 61a can act on both the separation membranes 24, 28 in the region surrounded by the first rectangular mesh 52a.

As a result, according to the raw water channel spacer 40, formation of the concentration polarization layer can be suppressed by sweeping away the ions and salts remaining in the region in the vicinity of both the separation membranes 24, 28, while an increase in the pressure loss is prevented.

According to the raw water channel spacer 40, a large shear stress can act on both the separation membranes 24, 28, so that it is possible to suppress occurrence of biofouling, that is, a state where both the separation membranes 24, 28 are clogged by a substance derived from bacterial cells such as a biofilm.

Next, modifications of the raw water channel spacer of the present embodiment will be described with reference to FIGS. 7 to 14. In the following description, the parts having the same configuration as the raw water channel spacer 40 of the above embodiment are denoted by the same reference numerals as those in the above embodiment, the description thereof will be omitted as appropriate, and only the parts having different configurations will be described.

Figure 8:
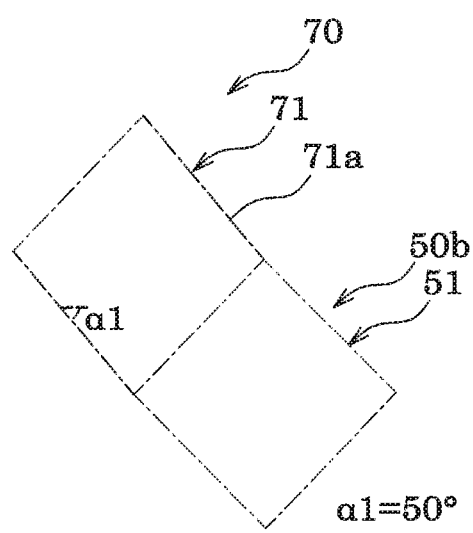
FIG. 8(a) is a diagram showing a configuration of a first mesh structure and a second mesh structure in the raw water channel spacer of Modification 1.
FIG. 8(b) is a diagram showing a configuration of a first mesh structure and a second mesh structure in the raw water channel spacer of Modification 2.
FIG. 8(c) is a diagram showing a configuration of a first mesh structure and a second mesh structure in the raw water channel spacer of Modification 3.
FIG. 8(d) is a diagram showing a configuration of a first mesh structure and a second mesh structure in the raw water channel spacer of Modification 4.
Figure 8:
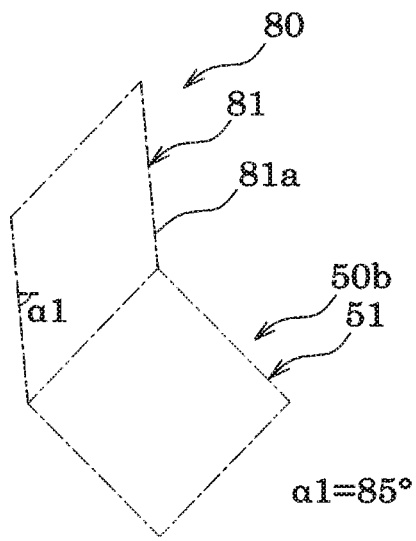
Figure 8:
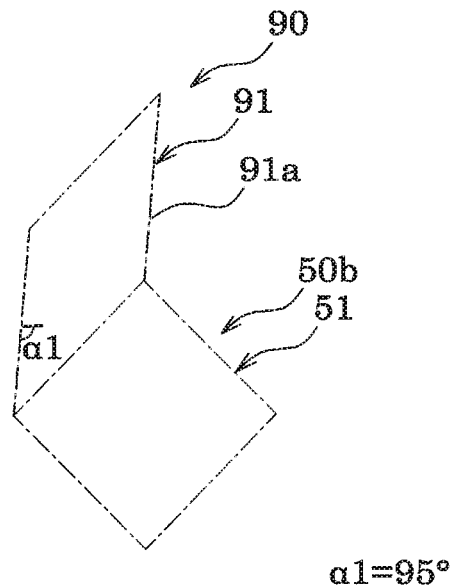
Figure 8:
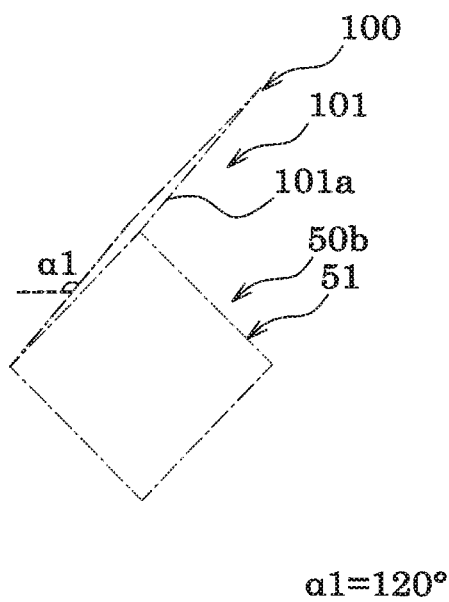
Figure 8:
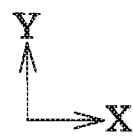
Figure 10:
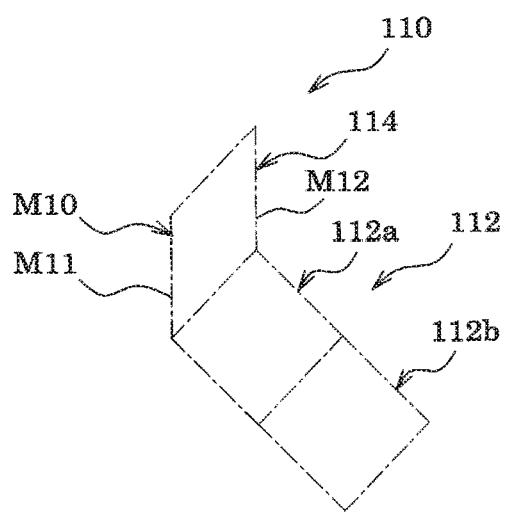
FIG. 10(a) is a diagram showing a configuration of a first mesh structure and a second mesh structure in the raw water channel spacer of Modification 5.
FIG. 10(b) is a diagram showing a configuration of a first mesh structure and a second mesh structure in the raw water channel spacer of Modification 6.
FIG. 10(c) is a diagram showing a configuration of a first mesh structure and a second mesh structure in the raw water channel spacer of Modification 7.
FIG. 10(d) is a diagram showing a configuration of a first mesh structure and a second mesh structure in the raw water channel spacer of Modification 8.
FIG. 10(e) is a diagram showing a configuration of a first mesh structure and a second mesh structure in the raw water channel spacer of Modification 9.
Figure 10:
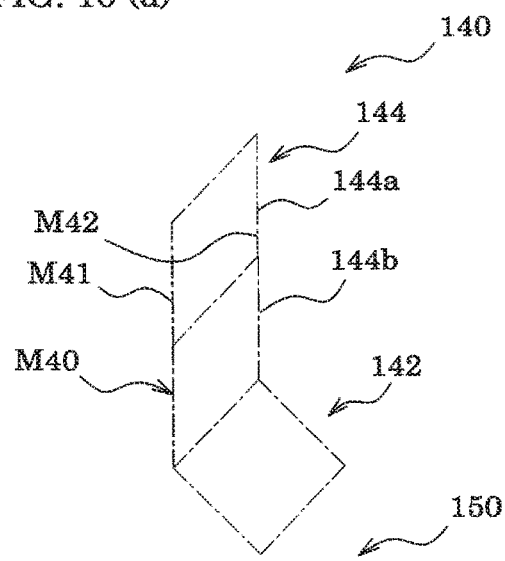
Figure 10:
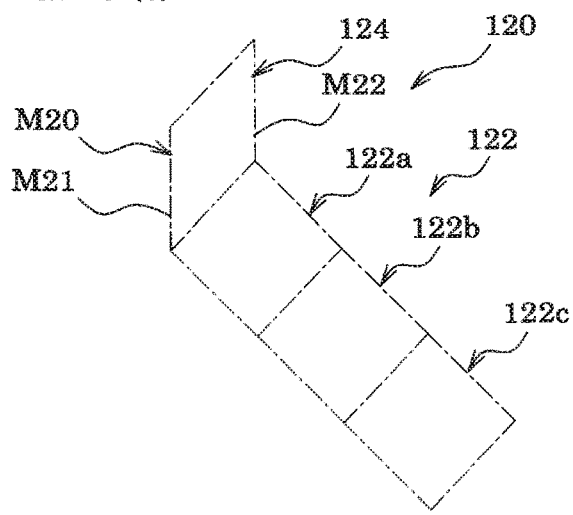
Figure 10:
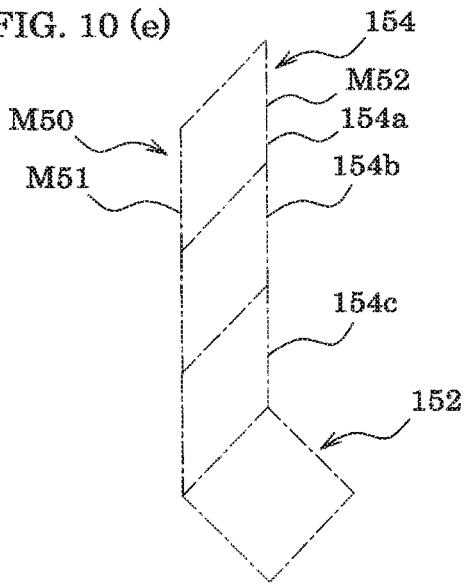
Figure 10:
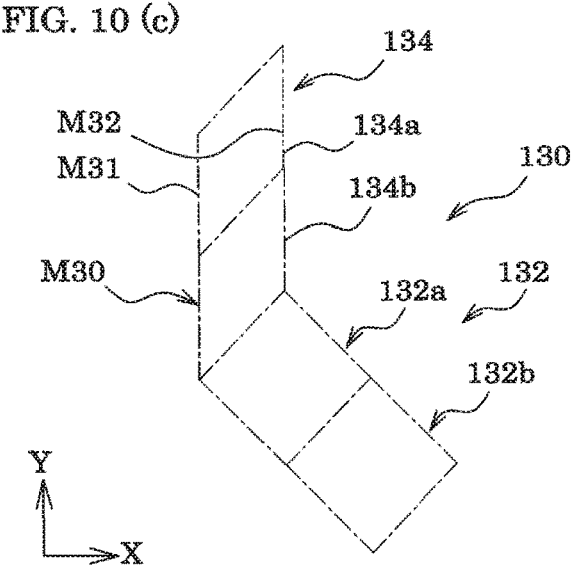

Table 1 shown in FIG. 7 shows a result obtained by the fluid analysis simulation regarding the proportion of the area of the easy-polarization region to both the separation membranes 24, 28 in the raw water channel spacers of Modifications 1 to 4 in which the inclination angle α1 in the first mesh structure varies. FIGS. 8(a) to 8(d) are diagrams schematically showing the shape of the first rectangular mesh in the first mesh structure, and the shape of the second rectangular mesh in the second mesh structure in each of the raw water channel spacers of Modifications 1 to 4. In FIGS. 8 (a) to 8 (d), the flow speed of the raw water flowing into the region T (see FIG. 3) along the X direction is set to 0.162 m/s. Each of the raw water channel spacers 70, 80, 90, 100 shown in FIGS. 8(a) to 8(d) has the same configuration as that of the raw water channel spacer 40 of the above embodiment, except that the configuration of the second rectangular mesh is different.

As shown in FIG. 8(a), the configuration of the raw water channel spacer 70 of Modification 1 is different from the configuration of the raw water channel spacer 40 of the above embodiment, in that the raw water channel spacer 70 is provided such that the inclination angle α1 of the second rectangular mesh 71a forming the second mesh structure 71 is 50°. As shown in FIG. 7, according to the raw water channel spacer 70, the proportion of the area of the easy-polarization region to the surfaces of both the separation membranes 24, 28 is 19%.

As shown in FIG. 8(b), the configuration of the raw water channel spacer 80 of Modification 2 is different from the configuration of the raw water channel spacer 40 of the above embodiment, in that the raw water channel spacer 80 is provided such that the inclination angle α1 of the second rectangular mesh 81a forming the second mesh structure 81 is 85°. As shown in FIG. 7, according to the raw water channel spacer 80, the proportion of the area of the easy-polarization region to the surfaces of both the separation membranes 24, 28 is 17%.

As shown in FIG. 8(c), the configuration of the raw water channel spacer 90 of Modification 3 is different from the configuration of the raw water channel spacer 40 of the above embodiment, in that the raw water channel spacer 90 is provided such that the inclination angle α1 of the second rectangular mesh 91a forming the second mesh structure 91 is 95°. As shown in FIG. 7, according to the raw water channel spacer 90, the proportion of the area of the easy-polarization region to the surfaces of both the separation membranes 24, 28 is 15%.

As shown in FIG. 8(d), the configuration of the raw water channel spacer 100 of Modification 4 is different from the configuration of the raw water channel spacer 40 of the above embodiment, in that the raw water channel spacer 100 is provided such that the inclination angle α1 of the second rectangular mesh 101a forming the second mesh structure 101 is 120°. As shown in FIG. 7, according to the raw water channel spacer 100, the proportion of the area of the easy-polarization region to the surfaces of both the separation membranes 24, 28 is 10%.

If the inclination angle is made larger than the inclination angle α1 of the raw water channel spacer shown in Modification 4, the first mesh structure and the second mesh structure interfere with each other, making manufacturing difficult. Therefore, it is preferable to set the inclination angle α1 to 120° or less.

As described above, also in the configurations of Modifications 1 to 4, formation of the concentration polarization layer can be suppressed as similar to the raw water channel spacer 40 of the above embodiment.

Table 2 FIG. 9 shows a result obtained by determining the proportion of the area of the easy-polarization region to the surfaces of both the separation membranes 24, 28 by fluid analysis simulation as similar to the raw water channel spacer 40 of the above embodiment, in the raw water channel spacers of Modifications 5 to 9 in which the composition ratio between the first mesh structure 51 and the second mesh structure 61 is changed. In the fluid analysis simulation shown in FIG. 9, the flow speed of the raw water flowing along the X direction is set to 0.162 m/s. FIGS. 10(a) to 10(e) are diagrams schematically showing the configuration of raw water channel spacers in the cases of Modifications 5 to 9.

A raw water channel spacer 110 of Modification 5 alternately includes a first mesh structure 112 and a second mesh structure 114 shown in FIG. 10(a). The first mesh structure 112 is configured by arranging two first rectangular meshes 112a, 112b in an extending direction of first yarns M11, M12 forming a first yarn row M10. The first rectangular meshes 112a, 112b have the same configuration as that of the first rectangular mesh 52a. The second mesh structure 114 has the same configuration as that of the second mesh structure 61. As shown in FIG. 9, in the raw water channel spacer 110, the proportion of the area of the easy-polarization region to the surfaces of both the separation membranes 24, 28 is 18%.

A raw water channel spacer 120 of Modification 6 alternately includes a first mesh structure 122 and a second mesh structure 124 shown in FIG. 10(a). The first mesh structure 122 is configured by arranging three first rectangular meshes 122a, 122b, 122c in an extending direction of first yarns M21, M22 forming a first yarn row M20. The first rectangular meshes 122a to 122c have the same configuration as that of the first rectangular mesh 52a. The second mesh structure 124 has the same configuration as that of the second mesh structure 61. As shown in FIG. 9, in the raw water channel spacer 120, the proportion of the area of the easy-polarization region to the surfaces of both the separation membranes 24, 28 is 19%.

A raw water channel spacer 130 of Modification 7 alternately includes a first mesh structure 132 and a second mesh structure 134 shown in FIG. 10(c). The first mesh structure 132 is configured by arranging two first rectangular meshes 132a, 132b in an extending direction of yarns M31, M32 forming a first yarn row M30. The first rectangular meshes 132a, 132b have the same configuration as that of the first rectangular mesh 52a. The second mesh structure 134 is configured by arranging two second rectangular meshes 134a, 134b in the extending direction of the first yarns M31, M32 forming the first yarn row M30. As shown in FIG. 9, in the raw water channel spacer 130, the proportion of the area of the easy-polarization region to the surfaces of both the separation membranes 24, 28 is 16%.

A raw water channel spacer 140 of Modification 8 alternately includes a first mesh structure 142 and a second mesh structure 144 shown in FIG. 10(d). The first mesh structure 142 has the same configuration as that of the first mesh structure 51. The second mesh structure 144 is configured by arranging two second rectangular meshes 144a, 144b in an extending direction of first yarns M41, M42 forming a first yarn row M40. The second rectangular meshes 144a, 144b have the same configuration as that of the second rectangular mesh 61a. As shown in FIG. 9, in the raw water channel spacer 140, the proportion of the area of the easy-polarization region to the surfaces of both the separation membranes 24, 28 is 15%.

The raw water channel spacer 150 of Modification 9 alternately includes a first mesh structure 152 and a second mesh structure 154 shown in FIG. 10(e). The first mesh structure 152 has the same configuration as that of the first mesh structure 51. The second mesh structure 154 is configured by arranging three second rectangular meshes 154a, 154b, 154c in an extending direction of first yarns M51, M52 forming a first yarn row M50. In this raw water channel spacer 150, the proportion of the area of the easy-polarization region to the surfaces of both the separation membranes 24, 28 is 14%.

As described above, also in the configurations of Modifications 5 to 9, formation of the concentration polarization layer can be suppressed as similar to the raw water channel spacer 40 of the above embodiment.

Figure 11:
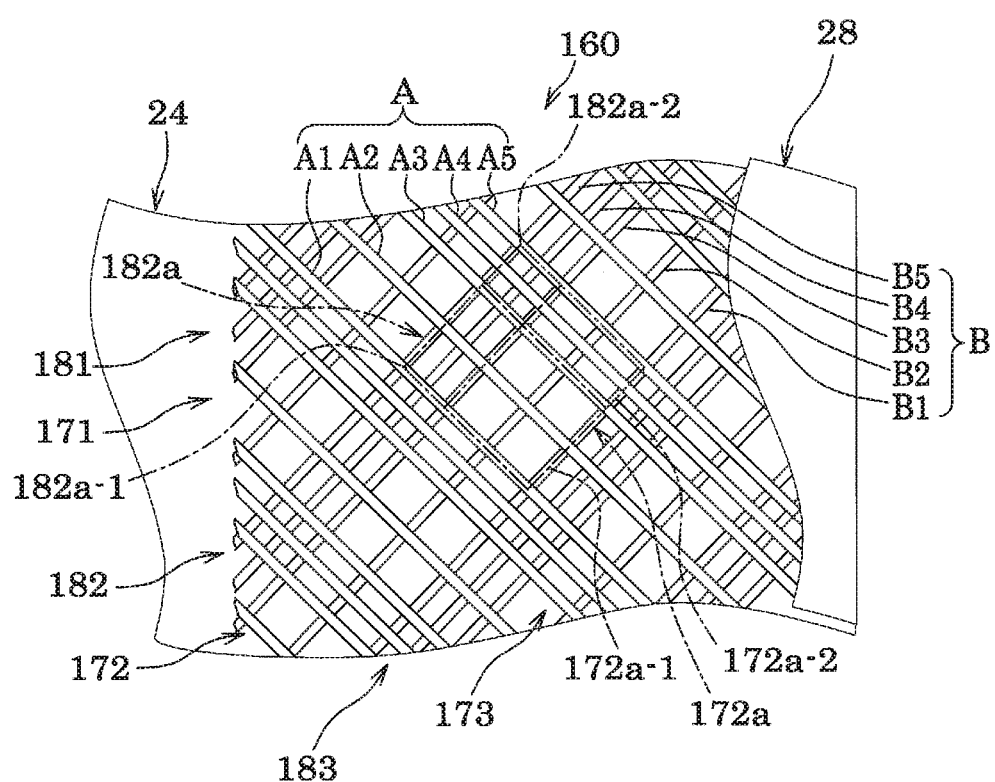
FIG. 11 is a diagram showing a configuration of a raw water channel spacer of Modification 10.
Figure 12:
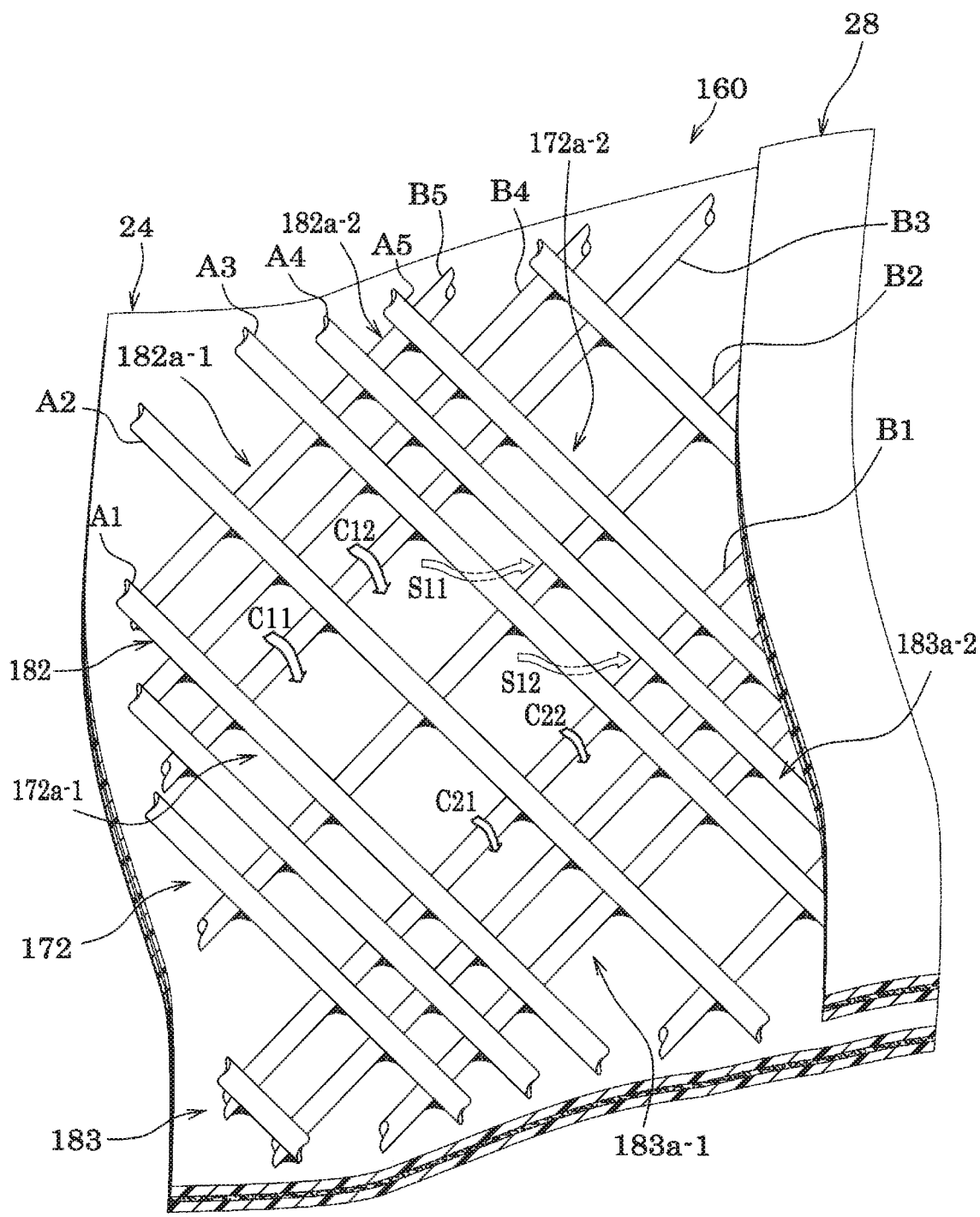
FIG. 12 is a perspective view showing the configuration of the raw water channel spacer sandwiched between a first separation membrane and a second separation membrane shown in FIG. 11.

FIG. 11 is a diagram showing a configuration of a raw water channel spacer 160 of Modification 10. FIG. 12 is an enlarged view showing a configuration of a first mesh structure and a second mesh structure included in the raw water channel spacer 160 shown in FIG. 11.

As shown in FIG. 11 and FIG. 12, the raw water channel spacer 160 is a raw water channel spacer having a two-layer structure in which a first yarn row A and a second yarn row B are superimposed on each other, and is formed by fixing each of yarn rows A, B in a laminated state. As similar to each of the yarn rows M, N in the above embodiment, the yarn rows A, B incline, for example, by 45° in opposite directions from each other with respect to the X direction. An interval between the first yarns A1, A2 and an interval between the first yarns A2, A3 forming the first yarn row A are set to be the same, and are set to 4 mm as an example. Each of an interval between the first yarns A3, A4 and an interval between the first yarns A4, A5 is set to be half the interval between the first yarns A1, A2. Similarly, an interval between the second yarns B1, B2 and an interval between the second yarns B2, B3 forming the second yarn row B are set to be the same, and are set to 4 mm as an example. Each of an interval between the second yarns B3, B4 and an interval between the second yarns B4, B5 is set to be half the interval between the second yarns B1, B2. Each of the yarns A1 to A5, B1 to B5 is formed in, for example, a columnar shape, and diameter thereof is 0.4 mm.

As shown in FIG. 11, the raw water channel spacer 160 alternately includes first mesh structures 171, 172, 173 and second mesh structures 181, 182, 183 configured to be continuous in the extending direction of the second yarn row B by the first yarn row A and the second yarn row B described above. Since the first mesh structures 171 to 173 have the same configuration and the second mesh structures 181 to 183 also have the same configuration, in the following description, the first mesh structure 172 and the second mesh structure 182 are described as examples.

The first mesh structure 172 is configured by alternately arranging along the extending direction of the second yarn row B, a first mesh 172a-1 formed of the first yarns A1 to A3 and the second yarns B1 to B3, and an intermediate mesh 172a-2 formed of the first yarns A3 to A5 and the second yarns B1 to B3. The first mesh 172a-1 has, for example, an appearance of a square shape. On the other hand, the intermediate mesh 172a-2, for example, has an appearance of a rectangular shape and is configured to have a finer mesh than the first mesh 172a-1. Therefore, when the first mesh 172a-1 and the intermediate mesh 172a-2 are compared, the channel resistance of the first mesh 172a-1 is smaller than that of the intermediate mesh 172a-2.

The second mesh structure 182 is configured by alternately arranging along the extending direction of the second yarn row B, an intermediate mesh 182a-1 formed of the first yarns A1 to A3 and the second yarns B3 to B5, and a second mesh 182a-2 formed of the first yarns A3 to A5 and the second yarns B3 to B5. As similar to the intermediate mesh 172a-2, the intermediate mesh 182a-1 has, for example, an appearance of a rectangular shape and is configured to have a mesh of the same roughness as the intermediate mesh 172a-2. The second mesh 182a-2 has, for example, an appearance of a square shape and is formed to have finer meshes than the intermediate mesh 182a-1. Therefore, when the second mesh 182a-2 and the intermediate mesh 182a-1 are compared, the channel resistance of the second mesh 182a-2 is larger than that of the intermediate mesh 182a-1.

As shown in FIG. 12, in the second mesh structure 182, part of the raw water flows along flows C11, C12 from the intermediate mesh 182a-1 into the first mesh 172a-1 in the first mesh structure 172 on the downstream side. In the first mesh. 172a-1, part of the raw water flows along flows C21, C22 from the first mesh 172a-1 into the intermediate mesh 183a-1 of the second mesh structure 183 on the downstream side.

Here, the second mesh. 182a-2 and the first mesh 172a-1 are adjacent to the downstream side of the raw water flow of the intermediate mesh 182a-1. Since the second mesh 182a-2 has a greater flow resistance than that of the first mesh 172a-1, a flow rate Q11 of the raw water flowing along the flows C11, C12 from the intermediate mesh 182a-1 into the first mesh 172a-1 is larger than a flow rate Q12 of the raw water flowing into the second mesh 182a-2.

On the other hand, the intermediate meshes 172a-2, 183a-1 are adjacent on the downstream side of the first mesh 172a-1. The meshes 172a-2, 183a-1 have almost the same roughness, and thus have almost the same level of channel resistance. Therefore, a flow rate Q12 of the raw water flowing along the flows C21, C22 out to the intermediate mesh 183a-1 and a flow rate Q13 of the raw water flowing along the flows S11, S12 out to the intermediate mesh 172a-2 are almost the same.

Accordingly, the flow rate Q13 of the raw water flowing along the flows S11, S12 from the first mesh 172a-1 in the first mesh structure 172 into the intermediate mesh 172a-2 on the downstream side increases by an amount of a differential flow rate $\Delta Q_{11\text{-}12}$ between the flow rate Q11 flowing along the flows C11, C12 from the second mesh structure 182 into the first mesh 172a-1 in the first mesh structure 172 and the flow rate Q12 flowing along the flows C21, C22 from the first mesh 172a-1 out to the second mesh structure 183. As described above, also in the raw water channel spacer 160, the water force of the raw water flowing through the first mesh structure 172 can be increased, and an effect similar to that of the raw water channel spacer 40 of the above embodiment can be obtained.

According to the fluid analysis simulation performed on the raw water channel spacer 160 under the same conditions as those of the above-described raw water channel spacer 40, the proportion of the area of the easy-polarization region to the surfaces of both the separation membranes 24, 28 was 17%.

In the fluid analysis simulation, the average value of the shear stress acting on both the separation membranes 24, 28 by the raw water flow when the raw water channel spacer 160 was used was 2.6 Pa, whereas the average value of the shear stress in the case of the above-described raw water channel spacer 40 was 3.3 Pa.

Therefore, when the raw water channel spacer 160 is used, the average shear stress acting on both the separation membranes 24, 28 is reduced by approximately 20% as compared with the above-described raw water channel spacer 40. Therefore, it is possible to obtain an effect that the pressure loss can be suppressed as compared with the raw water channel spacer 40.

Figure 13:
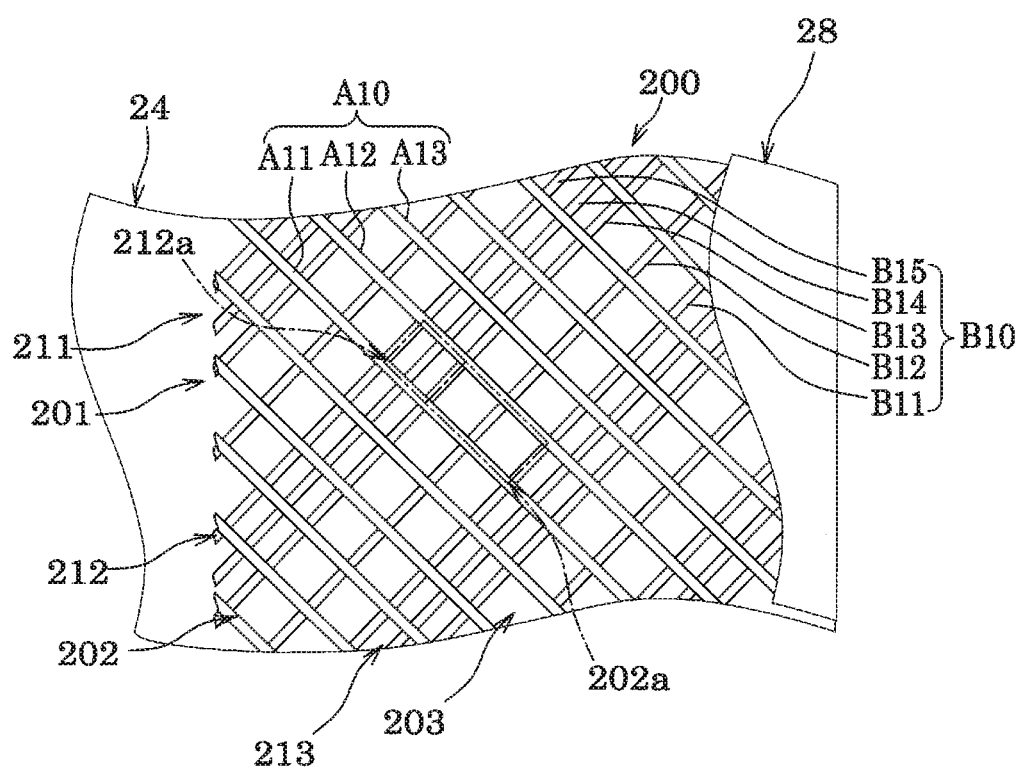
FIG. 13 is a diagram showing a configuration of a raw water channel spacer of Modification 11.

FIG. 13 is a diagram showing a configuration of a raw water channel spacer 200 of Modification 11. As shown in FIG. 13, the raw water channel spacer 200 is a modification of the above-described raw water channel spacer 160. In the following description, only the portions different in configuration from the raw water channel spacer 160 are described, and description of common portions of the configuration is omitted as appropriate.

As shown in FIG. 13, the raw water channel spacer 200 is a raw water channel spacer having a two-layer structure in which a first yarn row A10 and a second yarn row B10 are superimposed with each other, and is formed by fixing the yarn rows A10, B10 in a laminated state. The configuration of the raw water channel spacer 200 is different from that of the raw water channel spacer 160 in that each of yarns A11, A12, A13 forming the first yarn row A10 are arranged at regular intervals. On the other hand, configurations of second yarns B11 to B15 forming the second yarn row B10 are the same as those of the second yarns B1 to B5 in the above-described raw water channel spacer 160.

As shown in FIG. 13, the raw water channel spacer 200 alternately includes first mesh structures 201, 202, 203 and second mesh structures 211, 212, 213 configured to be along the second yarn row B10 by the first yarn row A10 and the second yarn row B10 described above. The first mesh structures 201 to 203 have the same configuration, and the second mesh structures 211 to 213 have the same configuration. Therefore, in the following description, the first mesh structure 202 and the second mesh structure 212 will be described as examples.

The first mesh structure 202 includes a first mesh 202a formed of the first yarns A11, A12 and the second yarns B11 to B13, and is configured by a number of meshes having the same configuration as that of the first mesh 202a being continuous in multiple in the extending direction of the second yarn row B10.

The second mesh structure 212 includes a second mesh 212a formed of the first yarns A11, A12 and the second yarns B13 to B15, and is configured by a number of meshes having the same configuration as that of the second mesh 212a being continuous is multiple in the extending direction of the second yarn row B10. This second mesh 212a is formed to have finer meshes than the first mesh 202a. Therefore, the channel resistance of the second mesh 212a is larger than that of the first mesh 202a.

According to the fluid analysis simulation performed on the raw water channel spacer 200 under the same conditions as those of the raw water channel spacer 40 of the above embodiment, the proportion of the area of the easy-polarization region to the surface of each of the separation membranes 24, 28 was 17%. Also in the raw water channel spacer 200 of Modification 11, an effect similar to that of the raw water channel spacer 160 described above can be obtained.

Figure 14:
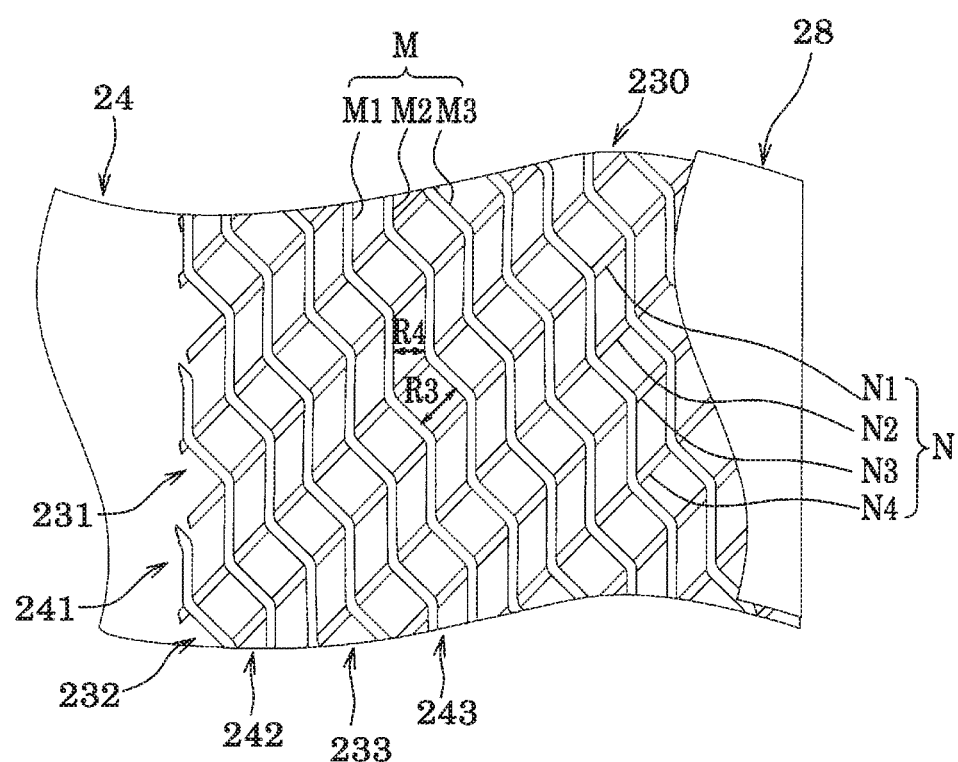
FIG. 14 is a diagram showing a configuration of a raw water channel spacer of Modification 12.

FIG. 14 is a diagram showing a configuration of a raw water channel spacer 230 of Modification 12. The raw water channel spacer 230 alternately includes first mesh structures 231, 232, 233 and second mesh structures 241, 242, 243 formed by superimposing the yarn rows M, N. Here, since the first mesh structures 231, 232, 233 have the same configuration and the second mesh structures 241, 242, 243 have the same configuration, in the following description, the first mesh structure 232 and the second mesh structure 241 will be described as examples for explanation of the raw water channel spacer 230.

The configuration of the raw water channel spacer 230 is different from the configuration of the above-described raw water channel spacer 40 in that the intervals of the yarn rows N are regular intervals. On the other hand, for the intervals of the yarn rows M, an interval R4 between the yarns M1, M2 forming the second mesh structure 241 is smaller than an interval R3 between the yarns M1, M2 forming the first mesh structure 232. In this way, the raw water channel spacer 230 may be configured such that the intervals in the second mesh structure 241 is smaller than the intervals in the first mesh structure 231 only for the yarn row M. In this case, however, the yarn row M corresponds to the second yarn row and the yarn row N corresponds to the first yarn row.

Figure 15:
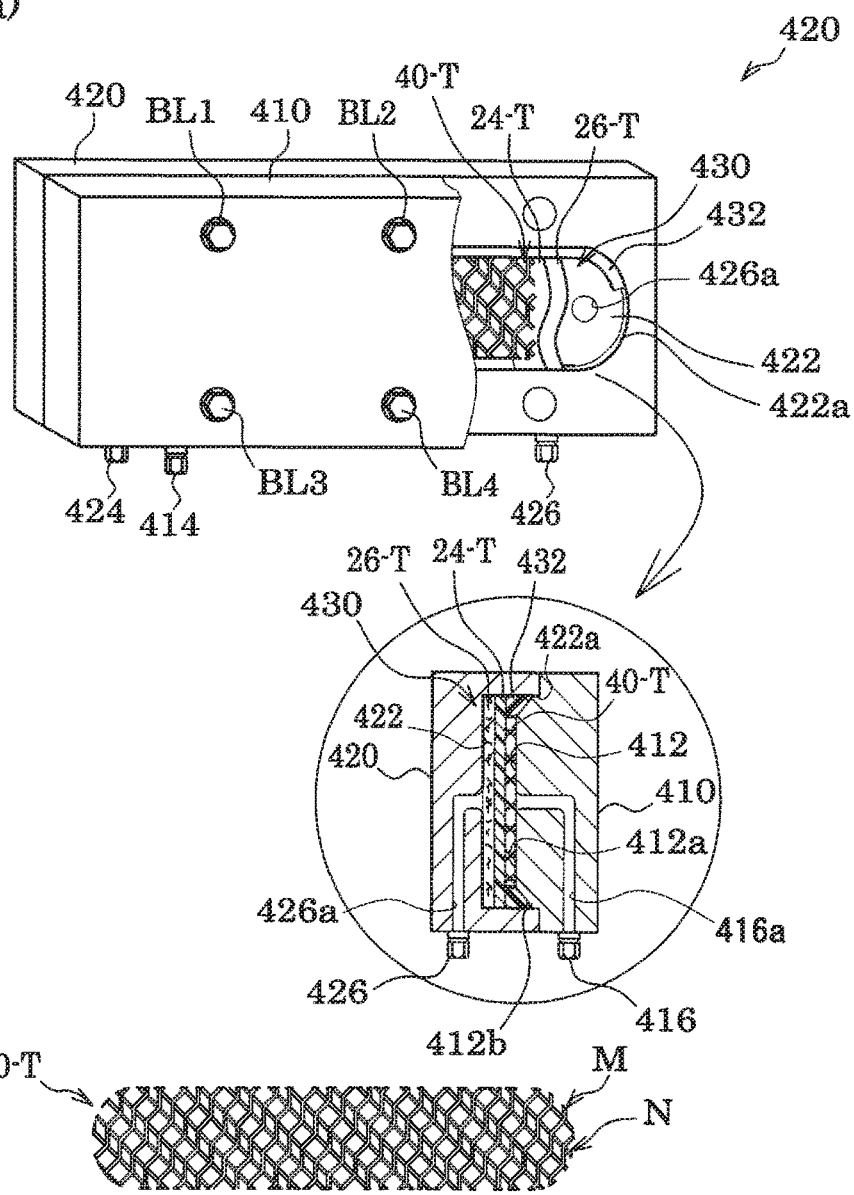
FIG. 15(a) is a perspective view showing an internal configuration with a configuration of a part of an evaluation cell used for evaluation of concentration polarization omitted.
FIG. 15(b) is a diagram showing a configuration of a test body of a raw water channel spacer installed inside the evaluation cell.
FIG. 15(c) is a diagram in which an outline is indicated by an imaginary line and a channel forming portion is indicated by a solid line to show a channel configuration formed inside the evaluation cell.
Figure 15:
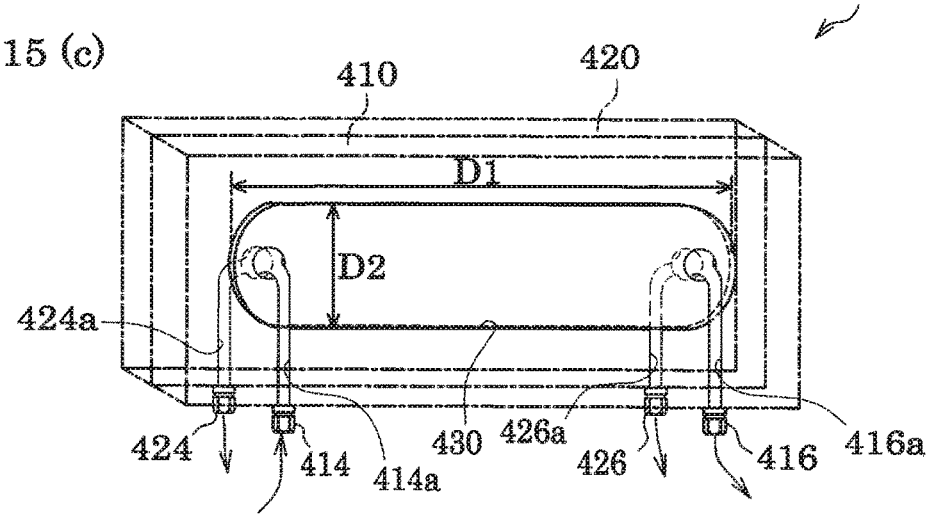

Next, a method of using an evaluation cell 400 used for an evaluation test of a concentration polarization suppression effect by the above-described raw water channel spacer 40, and the evaluation test using the cell 400 will be described with reference to FIGS. 15(a) to 15(c). FIG. 15(a) is a perspective view showing the evaluation cell 400 with a partial configuration of the cell omitted and partly including a cross-sectional view. FIG. 15(b) is a diagram showing a configuration of a test body of the raw water channel spacer 40 installed inside the evaluation cell 400. FIG. 15(c) is a diagram in which an outline is indicated by an imaginary line and a channel configuration portion is indicated by a solid line to show a channel configuration of the inside of the evaluation cell 400. In FIG. 15(a), the cross section of a test body 40-T in the raw water channel spacer 40 is hatched with "x" mark for convenience.

As shown in FIGS. 15(a) to 15(c), the evaluation cell 400 is a substantially rectangular parallelepiped concentration measuring unit formed by fitting a male mold 410 and a female mold 420 with each other. The evaluation cell 400 is used by being replaced with the spiral wound membrane element 20 included in the filtration device 10 shown in FIG. 1. As shown in FIG. 15(a), the male mold 410 is a metal or resin member having a protrusion 412 at the center. In the protrusion 412, a protruding surface 412a is formed in a rectangular rounded shape. The rectangular rounded shape means a shape having an outer shape in which, among short sides and long sides forming a rectangle, the short sides are replaced with curved lines protruding outward in a semicircular shape. A peripheral portion of the protruding surface 412a is chamfered, and an inclined surface 412b is formed.

The female mold 420 is a metal or resin member having a recess 422 provided in the center portion to be fit to the protrusion 412 of the male mold 410. In the evaluation cell 400, by fitting both the molds 410, 420, an evaluation channel 430 is formed between the protrusion 412 and the recess 422. As shown in FIG. 15(c), the evaluation channel 430 has a rectangular rounded outer shape. For example, the evaluation channel 430 has an overall length D1 of 167 mm, and a diameter of the semicircular portion formed at both ends, that is, a width D2 is 35 ma, and a thickness of the channel is approximately 1 mm.

As shown in FIGS. 15(a) and 15(c), the male mold 410 is provided with a pipe end 414 forming a raw water inlet and a pipe end 416 forming a concentrate outlet. A water feed pipe 12 (see FIG. 1) for supplying the raw water is connected to the pipe end 414 forming this raw water inlet, and a concentrate pipe 14 (see FIG. 1) is connected to the pipe end 416 forming the concentrate outlet. Both the pipe ends 414, 416 communicate with the evaluation channel 430 through communication channels 414a, 416a, respectively, provided inside the male mold 410. Also, the female mold 420 is attached with pipe ends 424, 426 forming permeate outlets, at positions facing the pipe ends 414, 416, respectively, of the male mold 410. Both the pipe ends 424, 426 communicate with the evaluation channel 430 through communication channels 424a, 426a, respectively, formed inside the female mold 420. Each of the pipe ends 424, 426 forming the permeate outlet is connected to the permeate pipe 13 (see FIG. 1).

Next, a method of using the evaluation cell 400 will be described. The evaluation channel 430 formed inside the evaluation cell 400 stores in a laminated state a test body 26-T of the permeate spacer 26, a test body 24-T of the separation membrane 24a, and the test body 40-T of the raw water channel spacer 40. Each of the test bodies 26-T, 24-T, 40-T is processed in advance into a rectangular rounded shape so as to fit in the recess 422 of the female mold 420 without gaps. At this time, as shown in FIG. 15(a), the test body 26-T of the permeate spacer, the test body 24-T of the separation membrane, and the test body 40-T of the raw water channel spacer are installed in the recess 422 in this order as seen from the female mold 420. Each of the test bodies 26-T, 24-T, 40-T is installed in this manner, so that the permeate that has permeated through the test body 24-T that is the separation membrane passes through the inside of the test body 26-T, and flows out from any of the communication channels 424a, 426a to the permeate pipe L3 (see FIG. 1). On the other hand, the raw water that has not permeated through the test body 24-T that is the separation membrane is discharged as concentrate to the concentrate pipe 14 (see FIG. 1) via the communication channel 416a.

Then, as shown in FIG. 15(a), an O-ring 432 is attached so as to be along a side wall 422a of the recess 422 after the test body 40-T is installed in the recess 422. The O-ring 432 is an annular member having a rectangular rounded outer periphery, and is a rubber packing having a circular cross section. The O-ring 432 is pressed against the inclined surface 412b formed on the protrusion 412 of the male mold 410 to close the gap between the protrusion 412 of the male mold 410 and the recess 422 of the female mold 420, and has a function as a sealing member for preventing water leakage from the evaluation channel 430. As similar to the test body 40-T of the raw water channel spacer 40, test bodies 160-T, 300-T are manufactured and evaluation is performed on the raw water channel spacer 160 of the modification and the raw water channel spacer 300 of the comparative example.

After each of the test bodies 24-T, 26-T, 40-T and the O-ring 432 are installed in the recess 422 of the female mold 420, the protrusion 412 of the male mold 410 is fit to the recess 422 as described above, and both the molds 410, 420 are fixed by a plurality of bolts BL1 to BL4 or the like (see FIG. 15(a)). In this case, when a gap remains between the protrusion 412 of the male mold 410 and the O-ring 432, a plurality of permeate spacers 26-T are superimposed, so that the O-ring 432 is adjusted so as to be pressed and brought into contact with the inclined surface 412b of the protrusion 412 and the side wall of the recess 422 therebetween. As a result, the work of attaching the test body 40-T of the raw water channel spacer 40 to the evaluation cell 400 is completed.

In this evaluation test, the test body 300-T was manufactured such that each of the intervals of yarn rows V (see FIG. 6(a)) and the intervals of yarn rows W (see FIG. 6(b)) was 2 mm. A diameter of each of yarns V1 to V3 and W1 to W3 forming each of the yarn rows V, W is 0.2 mm.

The test body 40-T was manufactured such that each of the intervals of the first yarn rows N (see FIG. 3) and the intervals of the second yarn rows N (see FIG. 3) was 2 mm. (Accordingly, in the test body 40-T, the above-described first rectangular mesh 52a has an appearance of a square shape with each side of 2 mm and the second rectangular mesh 61a has an appearance of a rhombic shape with each side of 2 mm.) A diameter D of each of the yarns M1 to M3 and N1 to N4 forming each of the yarn rows M, N is 0.2 mm.

The test body 160-T was manufactured so as to have an interval between the first yarns A1, A2 and an interval between the first yarns A2, A3 forming the first yarn row A (see FIG. 11) of 3 mm each, and have an interval between the first yarns A3, A4 and an interval between the first yarns A4, A5 of 1.5 mm each. For the second yarn row B (see FIG. 11), the test body 160-T was manufactured so as to have an interval between the second yarns B1, B2 and an interval between the second yarns B2, B3 of 3 mm each, and have an interval between the second yarns B3, B4 and an interval between the second yarns B4, B5 of 1.5 mm each. A diameter of each of yarns A1 to A5 and B1 to B5 forming each of the yarn rows A, B is 0.2 mm.

Next, an evaluation test of the raw water channel spacer using the evaluation cell 400 will be described. This evaluation test was carried out under the condition of temperature of 25° C.

First, a pure water permeability coefficient A is calculated. This "pure water" permeability coefficient is a permeability coefficient determined from the relationship of the following formula (1) in the case where the raw water supplied from the pipe end 414 to the evaluation cell 400 is pure water containing no impurities such as salt.

$$J_W = A \times P_{out} \quad (1)$$

In the above formula (1), $J_W$ is a pure water volume flux [m$^3$/(m$^2$s)], and $P_{out}$ is a measurement value of a water pressure gauge (not shown) installed in the concentrate pipe 14. As a method of calculating the pure water permeability coefficient A, a permeate flow rate $Q_{L3}$ [m$^3$/s] is measured, that is of the permeate pipe 13 in the case where $P_{out}$=0.5 MPa, and a concentrate flow rate $Q_{L4}$ in the concentrate pipe L4 is 14.5 cc/min due to adjustment of a flow rate adjustment valve (not shown) of the concentrate pipe L4 and a flow rate adjustment valve of a bypass pipe L2-B. Then, this permeate flow rate $Q_{L3}$ is divided by the area of the test body 24-T of the separation membrane 24a so that the pure water volume flux $J_{W1}$ is determined.

Similarly, in the case where $P_{out}$=2.0 MPa and the concentrate flow rate $Q_{L4}$ is set to 14.5 cc/min, the permeate flow rate $Q_{L3}$ [m$^3$/s] is measured, and the measurement value is divided by the area of the test body 24-T so that a pure water volume flux $J_{W2}$ is measured.

Then, using the $P_{out}$=0.5 MPa, the pure water volume flux $J_{W1}$, $P_{out}$=2.0 MPa, and the pure water volume flux $J_{W2}$, the pure water permeability coefficient A in the above formula (1) is determined by linear approximation by the least squares method.

Next, the raw water to be supplied to the evaluation cell 400 from the pipe end 414 changed to, for example, a sodium chloride (NaCl) solution adjusted so that the salt concentration is around 250 ppm, $P_{out}$ is set to 0.5 MPa, and the concentrate flow rate $Q_{L4}$ is set to 14.5±0.5 [cc/min], and the flow rate $Q_{L3}$ [m$^3$/s] of the permeate in this case is measured. Then, a solution volume flux Jv is calculated by dividing the flow rate $Q_{L3}$ of the permeate by the area of the test body 24-T, the calculated solution volume flux Jv is substituted into the following formula (2), and osmotic pressure $P_f$ on the membrane surface of the test body 24-T is calculated. In the following formula (2), $P_{out}$ is 0.5 MPa.

$$P_f = P_{out} - (Jv/A) \quad (2)$$

Then, a membrane surface concentration $C_m$ indicating the salt concentration in the raw water in the vicinity of the membrane surface of the test body 24-T that is the separation membrane is calculated by the following formula (3).

$$C_m = B \times P_f \tag{3}$$

A conversion coefficient B in the above formula (3) is a constant determined by the relationship between the salt concentration of NaCl, MgSO$_4$, CaCl$_2$ and the like contained in the raw water and the osmotic pressure, and as in the present embodiment, when the salt contained in the raw water is sodium chloride, the conversion coefficient B is 1.2294.

Next, bulk concentration Cb is calculated from the relationship of formula (4).

$$C_b = (C_{in} + C_{out})/2 \tag{4}$$

$C_{in}$ in the above formula (4) is the salt concentration of the raw water flowing through the water feed pipe L2, and $C_{out}$ is the salt concentration of the concentrate flowing through the concentrate pipe L4. In the present embodiment, since the salt concentration of sodium chloride contained in the raw water is adjusted in advance to around 250 ppm as described above, only the salt concentration $C_{out}$ of the concentrate flowing through the concentrate pipe 14 needs to be measured. Measurement of the salt concentration in the concentrate or the raw water may be performed by measuring electric conductivity as an example.

Then, the concentration ratio $C_r$ shown in the formula (5) that is the ratio of $C_m$ calculated by the formula (3) to $C_b$ calculated by the formula (4) is calculated.

$$C_r = C_m/C_b \tag{5}$$

Figure 16:
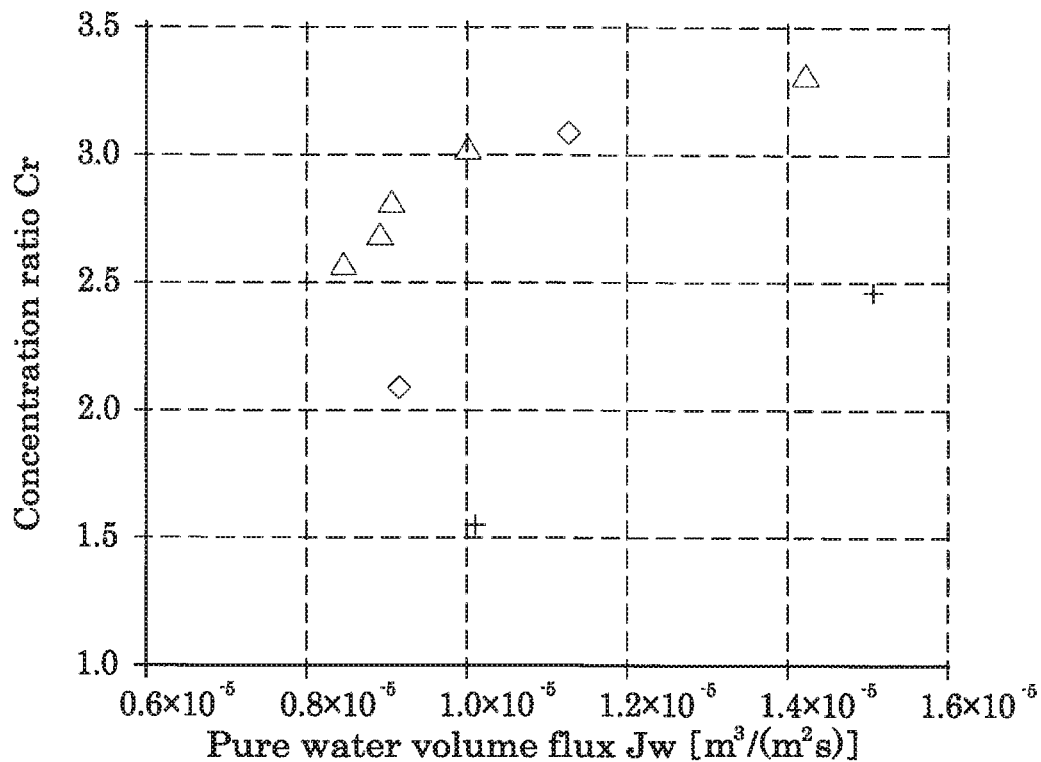
FIG. 16(a) is a graph showing a relationship between a concentration ratio in an evaluation test using a test body of each separation membrane, and a measurement value of a pure water volume flux in measuring of the concentration ratio.
FIG. 16(b) is a table showing the concentration ratio in the evaluation test using the test body of each separation membrane, and the measurement value of the pure water volume flux, shown in FIG. 16(a).

Here, FIG. 16(a) is a graph showing measurement results of each separation membrane with the above-described concentration ratio Cr on the vertical axis and the measurement value of the pure water volume flux $J_w$ on the horizontal axis. In FIG. 16(a), "△" represents the measurement value of the test body 300-T of the raw water channel spacer 300 of the comparative example, "◇" represents the measurement value of the test body 40-T of the raw water channel spacer 40, and "+" represents the measurement value of the test body 160-T of the raw water channel spacer 160 of Modification 10. FIG. 16(b) is a table showing measurement values of the concentration ratio Cr of each of the test bodies 40-T, 160-T, 300-T shown in FIG. 16(a), with the pure water volume flux $J_w$ at the time of measurement.

As shown in FIG. 3, the first yarn row M and the second yarn row N of the raw water channel spacer 40 are configured to be asymmetrical. Thus, the raw water flows in the vicinity of the membrane surface in the separation membrane 24a and the separation membrane 28a facing each other with the raw water channel spacer 40 interposed therebetween are largely different. Thus, the distribution states of the salt concentration. In the vicinity of both the separation membranes 24a, 28a are also largely different. Accordingly, in the evaluation test using the test body 40-T of the raw water channel spacer 40, it is necessary to measure concentration ratios $C_r$ in the case where in is performed such that the first yarn row M is in contact with the test body 24-T of the separation membrane 24, and the case where installation is performed such that the second yarn row N is in contact with the test body 24-T, and to evaluate the magnitude of the concentration polarization on the basis of the average value between the concentration ratios $C_r$.

Thus, FIG. 16(b) shows the case where installation is performed such that the first yarn row M is in contact with the test body 24-T as "B" and the case where installation is performed such that the second yarn row N is in contact with the test body 24-T as "A".

In the following description, the test body 40-T of the raw water channel spacer 10 in the installation state of "A" described above is referred to as a test body 40-TA, and the test body 40-T in the installation state of "B" described above is referred to as a test body 40-TB, as appropriate.

As shown in FIG. 16(a), in the evaluation test using the test body 40-TA, the concentration ratio $C_r$ is 2.1 with the pure water volume flux $J_w = 0.91 \times 10^{-5}$ [m$^3$/(m$^2$s)]. In the evaluation test using the test body 40-TB, the concentration ratio $C_r$ is 3.1 with the pure water volume flux $J_w - 1.13 \times 10^{-5}$ [m$^3$/(m$^2$s)]. Accordingly, the average value of the concentration ratios Cr in the test bodies 40-TA, 40-TB is 2.6, which is lower than the minimum value 2.7 of the concentration ratio Cr of the test body 300-T of the comparative example. Accordingly, it was seen that the raw water channel spacer 40 can reduce the concentration polarization more than the conventional raw water channel spacer 300.

As shown in FIG. 16(a), in the evaluation test using the test body 160-T of the raw water channel spacer 160, the concentration ratio $C_r$ in the case of the pure water volume flux $J_w = 1.03 \times 10^{-5}$ [m$^3$/(m$^2$s)] is 1.6, and the concentration ratio $C_r$ in the case of the pure water volume flux $J_w = 1.51 \times 10^{-5}$ [m$^3$/(m$^2$s)] is 2.4. As described above, it is understood that, in the evaluation test using the test body 160-T, the concentration ratio $C_r$ is significantly lower in all cases, than 2.7 that is the minimum value of the concentration ratio $C_r$ in the test body 300-T of the comparative example. Accordingly, it was seen that the raw water channel spacer 160 can reduce the concentration polarization more than the conventional raw water channel spacer 300.

In the evaluation test using the test body 160-T, the pressure loss $P_L$ in the case of the concentrate flow rate $Q_{L4}$ in the concentrate pipe L4 of 14.5cc/min was measured to be 6.4 kPa. The pressure loss $P_L$ is a differential pressure between the water pressure $P_{in}$ of the raw water supplied to the evaluation channel 430 of the evaluation cell 400 from the pipe end 414, and the above-described $P_{out}$.

Similarly, in the evaluation test using the test body 300-T, the pressure loss $P_L$ in the case of the concentrate flow rate $Q_{L4}$ described above of 14.5 cc/min was measured to be 8.6 kPa.

As described above, it was seen that the pressure loss can be reduced more than the conventional test body 300-T when the test body 160-T is used. Thus, the raw water channel spacer 160 can reduce both concentration polarization and pressure loss.

The present invention can be implemented in a mode in which various improvements, modifications, or variations are added on the basis of knowledge of those skilled in the art without departing from the spirit of the present invention. Further, the present invention may be implemented by replacing any matter specifying the invention with other technologies within the range where the same action or effect is produced.

The invention claimed is:

1. A raw water channel spacer having a two-layer structure that is adapted to be sandwiched between a first separation membrane and a second separation membrane in a state in which the first separation membrane, the two-layer structure, and the second separation membrane are all wound around a water collecting pipe of a spiral wound membrane element, the two-layer structure comprising:
   a first layer that includes first rows of parallel yarns and
   a second layer that includes second rows of parallel yarns, the first rows of parallel yarns and the second rows of parallel yarns being inclined in opposite directions from each other with respect to a flow direction across the two-layer structure, and the first rows of parallel yarns and the second rows of parallel yarns alternatingly forming a first mesh region and a second mesh region, wherein the first mesh region and the second mesh region alternate throughout the raw water channel spacer, the first mesh region extends in an extending direction of the second rows of parallel yarns so as to be parallel to the second mesh region, and the first mesh region comprising mesh openings formed by the first rows of parallel yarns and the second rows of parallel yarns;

the second mesh region extends in the extending direction of the second rows of parallel yarns so as to be parallel to the first mesh region, and the second mesh region comprising mesh openings formed by the first rows of parallel yarns and the second rows of parallel yarns, wherein spacing between the second rows of parallel yarns forming the second mesh region is smaller than spacing between the second rows of parallel yarns forming the first mesh region;

wherein the first layer is provided on one side of the second layer, wherein the first layer is formed only by the first rows of parallel yarns and the second layer is formed only by the second rows of parallel yarns, wherein one pattern of the first mesh region and another pattern of the first mesh region alternate, in the extending direction of the second rows of parallel yarns, throughout the raw water channel spacer, and the mesh openings that form the one pattern of the first mesh region are different in size from the mesh openings that form the another pattern of the first mesh region, wherein one pattern of the second mesh region and another pattern of the second mesh region alternate, in the extending direction of the second rows of parallel yarns, throughout the raw water channel spacer, and the mesh openings that form the one pattern of the second mesh region are different in size from the mesh openings that form the another pattern of the second mesh region, and wherein the first mesh region and the second mesh region alternate, throughout the raw water channel spacer, in an extending direction of the first rows of parallel yarns.

2. The raw water channel spacer according to claim 1, wherein
an inclination, with respect to the flow direction across the two-layer structure, of the first rows of parallel yarns forming the second mesh region is larger than an inclination, with respect to the flow direction across the two-layer structure, of the first rows of parallel yarns forming the first mesh region.

3. The raw water channel spacer according to claim 2, wherein
the first mesh region is configured by alternatingly arranging a first set of mesh openings as the one pattern of the first mesh region and a first set of intermediate mesh openings as the another pattern of the first mesh region, the first set of intermediate mesh openings having smaller mesh openings than the mesh openings of the first set of mesh openings, and
the second mesh region is configured by alternatingly arranging a second set of intermediate mesh openings as the one pattern of the second mesh region and a second set of mesh openings as the another pattern of the second mesh region, the second set of mesh openings having smaller mesh openings than the second set of intermediate mesh openings.

4. A spiral wound membrane element comprising:
a water collecting pipe through which permeate flows;
a sheet-like permeate spacer;
a first separation membrane and a second separation membrane that are each formed in a bag shape in which three sides are sealed in a state where the separation membranes are superimposed on both surfaces of the permeate spacer, and the other side is made to be an open end, the separation membranes wound around the water collecting pipe in a state where the open end is connected to the water collecting pipe; and
the raw water channel spacer according to claim 3.

5. A raw water channel spacer having a two-layer structure that is adapted to be sandwiched between a first separation membrane and a second separation membrane in a state in which the first separation membrane, the two-layer structure, and the second separation membrane are all wound around a water collecting pipe of a spiral wound membrane element, the two-layer structure comprising:
a first layer that includes first rows of parallel yarns and a second layer that includes second rows of parallel yarns, the first rows of parallel yarns and the second rows of parallel yarns being inclined in opposite directions from each other with respect to a flow direction across the two-layer structure, and the first rows of parallel yarns and the second rows of parallel yarns alternatingly forming a first mesh region and a second mesh region, wherein the first mesh region and the second mesh region alternate throughout the raw water channel spacer, the first mesh region extends in an extending direction of the second rows of parallel yarns so as to be parallel to the second mesh region, and the first mesh region comprising mesh openings formed by the first rows of parallel yarns and the second rows of parallel yarns;

the second mesh region extends in the extending direction of the second rows of parallel yarns so as to be parallel to the first mesh region, and the second mesh region comprising mesh openings formed by the first rows of parallel yarns and the second rows of parallel yarns, wherein spacing between the second rows of parallel yarns forming the second mesh region is smaller than spacing between the second rows of parallel yarns forming the first mesh region;

wherein the first layer is provided on one side of the second layer, wherein the first layer is formed only by the first rows of parallel yarns and the second layer is formed only by the second rows of parallel yarns, and wherein
the first mesh region is configured by alternatingly arranging a first pair of mesh openings and a first pair of intermediate mesh openings having smaller mesh openings than the mesh openings of the first pair of mesh openings, and
the second mesh region is configured by alternatingly arranging a second pair of intermediate mesh openings and a second pair of mesh openings having smaller mesh openings than the second pair of intermediate mesh openings.

6. A spiral wound membrane element comprising:
a water collecting pipe through which permeate flows;
a sheet-like permeate spacer;

a first separation membrane and a second separation membrane that are each formed in a bag shape in which three sides are sealed in a state where the separation membranes are superimposed on both surfaces of the permeate spacer, and the other side is made to be an open end, the separation membranes wound around the water collecting pipe in a state where the open end is connected to the water collecting pipe; and the raw water channel spacer according to claim 1.

7. A spiral wound membrane element comprising:

a water collecting pipe through which permeate flows;

a sheet-like permeate spacer;

a first separation membrane and a second separation membrane that are each formed in a bag shape in which three sides are sealed in a state where the separation membranes are superimposed on both surfaces of the permeate spacer, and the other side is made to be an open end, the separation membranes wound around the water collecting pipe in a state where the open end is connected to the water collecting pipe; and the raw water channel spacer according to claim 2.

8. A spiral wound membrane element comprising:

a water collecting pipe through which permeate flows;

a sheet-like permeate spacer;

a first separation membrane and a second separation membrane that are each formed in a bag shape in which three sides are sealed in a state where the separation membranes are superimposed on both surfaces of the permeate spacer, and the other side is made to be an open end, the separation membranes wound around the water collecting pipe in a state where the open end is connected to the water collecting pipe; and the raw water channel spacer according to claim 5.

9. A raw water channel spacer having a two-layer structure that is adapted to be sandwiched between a first separation membrane and a second separation membrane in a state in which the first separation membrane, the two-layer structure, and the second separation membrane are all wound around a water collecting pipe of a spiral wound membrane element, the two-layer structure comprising:

a first layer that includes first rows of parallel yarns and a second layer that includes second rows of parallel yarns, the first rows of parallel yarns and the second rows of parallel yarns being inclined in opposite directions from each other with respect to a flow direction across the two-layer structure, and the first rows of parallel yarns and the second rows of parallel yarns alternatingly forming a first mesh region and a second mesh region, the first mesh region extends in an extending direction of the second rows of parallel yarns so as to be parallel to the second mesh region, and the first mesh region comprising mesh openings formed by the first rows of parallel yarns and the second rows of parallel yarns;

the second mesh region extends in the extending direction of the second rows of parallel yarns so as to be parallel to the first mesh region, and the second mesh region comprising mesh openings formed by the first rows of parallel yarns and the second rows of parallel yarns, wherein spacing between the second rows of parallel yarns forming the second mesh region is smaller than spacing between the second rows of parallel yarns forming the first mesh region;

wherein the first layer is provided on one side of the second layer; and further comprising:

(i) the first rows of parallel yarns having a repeating pattern defined by:

three consecutively arranged parallel yarns that are equally spaced by a first spacing distance in the extending direction of the second rows of parallel yarns, a fourth consecutively arranged parallel yarn extending adjacent one of the three consecutively arranged parallel yarns, the fourth consecutively arranged parallel yarn being spaced from the adjacent one of the three consecutively arranged parallel yarns by a second spacing distance in the extending direction of the second rows of parallel yarns, and the second spacing distance being larger than the first spacing distance; and (ii) the second rows of parallel yarns having a repeating pattern defined by:

three consecutively arranged parallel yarns that are equally spaced by a third spacing distance in the extending direction of the first rows of parallel yarns, a fourth consecutively arranged parallel yarn extending adjacent one of the three consecutively arranged parallel yarns, the fourth consecutively arranged parallel yarn being spaced from the adjacent one of the three consecutively arranged parallel yarns by a fourth spacing distance in the extending direction of the first rows of parallel yarns, and the fourth spacing distance being larger than the third spacing distance.

10. The raw water channel spacer according to claim 9, further comprising:

the first rows of parallel yarns being oriented at a 45° angle with respect to the flow direction across the two-layer structure, and the second rows of parallel yarns being oriented at a 90° angle with respect to the first rows of parallel yarns.

11. The raw water channel spacer according to claim 9, wherein the first rows of parallel yarns and the second rows of parallel yarns each have a same diameter.

12. The raw water channel spacer according to claim 10, wherein the first rows of parallel yarns and the second rows of parallel yarns each have a same diameter.

13. The raw water channel spacer according to claim 10, wherein the first rows of parallel yarns and the second rows of parallel yarns are made of a polyester, polyethylene, or polypropylene material.

* * * * *